US012718155B2

(12) United States Patent
Carroll et al.

(10) Patent No.: US 12,718,155 B2
(45) Date of Patent: Aug. 25, 2026

(54) SYSTEMS, METHODS AND USER INTERFACES FOR CO-HOSTING IN ONLINE MARKETPLACES

(71) Applicant: Airbnb, Inc., San Francisco, CA (US)

(72) Inventors: Brian Carroll, Boca Raton, FL (US); Sushu Zhang, Palo Alto, CA (US)

(73) Assignee: AIRBNB, INC., San Francisco, CA (US)

( * ) Notice: Subject to any disclaimer, the term of this patent is extended or adjusted under 35 U.S.C. 154(b) by 0 days.

(21) Appl. No.: 18/653,860

(22) Filed: May 2, 2024

(65) Prior Publication Data

US 2024/0370782 A1 Nov. 7, 2024

Related U.S. Application Data

(60) Provisional application No. 63/499,664, filed on May 2, 2023.

(51) Int. Cl.
*G06Q 10/02* (2012.01)
*G06Q 30/0645* (2023.01)

(52) U.S. Cl.
CPC ......... *G06Q 10/02* (2013.01); *G06Q 30/0645* (2013.01)

(58) Field of Classification Search
CPC ........ G06Q 10/02; G06Q 10/06; G06Q 30/06; G06Q 30/0617; G06Q 30/0645
See application file for complete search history.

(56) References Cited

U.S. PATENT DOCUMENTS

2001/0037280 A1* 11/2001 Ingraham ............... G06Q 40/04 705/37
2008/0010173 A1* 1/2008 Rendich ................. G06Q 30/06 705/28
2010/0293011 A1 11/2010 Lebreton et al.
(Continued)

OTHER PUBLICATIONS

Carter, "Top 10 Property Manager Websites," Property Manager Websites, Oct. 6, 2022, Retrieved from https://web.archive.org/web/20221006012533/https://www.propertymanagerwebsites.com/blog/top-10-property-manager-websites (Year: 2022).*
(Continued)

*Primary Examiner* — Bryan J Kirk
(74) *Attorney, Agent, or Firm* — McDermott Will & Schulte LLP

(57) ABSTRACT

A method is provided for host management in an online marketplace. The method includes obtaining a property listing listed on the online marketplace. The method may also include providing a host management graphical user interface for managing co-hosts. If the property listing is associated with one or more co-hosts, the method includes displaying host detail affordances. In response to detecting a user selecting a host detail affordance corresponding to a co-host, the method includes displaying permissions, payouts, and activity log, for the co-host. If the property listing is not associated with co-hosts, the method includes displaying a co-host add option to add a co-host for the property listing. The method may also include, in response to detecting an input from the user, to select the co-host add option, allowing the user to specify a new co-host and associating the new co-host with the property listing.

18 Claims, 18 Drawing Sheets

(56) References Cited

U.S. PATENT DOCUMENTS

| | | | | |
|---|---|---|---|---|
| 2014/0351037 | A1 | 11/2014 | Shaam et al. | |
| 2017/0063867 | A1* | 3/2017 | Singh | G06F 21/31 |
| 2018/0063150 | A1* | 3/2018 | Rovito | G05B 15/02 |
| 2019/0213507 | A1 | 7/2019 | Ifrach et al. | |
| 2023/0334929 | A1 | 10/2023 | Pazzi et al. | |

OTHER PUBLICATIONS

Bosma, J.R., Platformed professionalization: Labor, assets, and earning a livelihood through Airbnb. Environment and Planning A: Economy and Space, 2022, 54(4), 595-610. https://doi.org/10.1177/0308518X211063492.

International Search Report and Written Opinion for International Patent Application No. PCT/US2024/027557, Aug. 14, 2024 (29 Pages).

* cited by examiner

Figure 4A
400
9:41
412
Cozy Studio with Sweeping Downtown Views
418
Listing
Booking settings
Co-Hosts
414
416
Invite a Co-Host
A Co-Host can help you with everything from managing your calendar to welcoming guests.
Get started
Learn about co-hosting
420

528

532

SYSTEMS, METHODS AND USER INTERFACES FOR CO-HOSTING IN ONLINE MARKETPLACES

RELATED APPLICATIONS

This application claims priority to U.S. Provisional Application Ser. No. 63/499,664, filed May 2, 2023, entitled "Systems, Methods and User Interfaces for Co-Hosting in Online Marketplaces," which is incorporated by reference herein in its entirety.

TECHNICAL FIELD

This application relates generally to special-purpose machines that manage interfaces and data processing and improvements to such variants, and to the technologies by which such special-purpose machines become improved compared to other special-purpose machines for online marketplaces.

BACKGROUND

Web or cloud-based systems may help users perform a variety of tasks, a common one being e-commerce websites that permit users to buy, rent, or reserve products and/or services. Online marketplaces need to support owners, hosts, and co-hosts, to host properties in such a way that facilitates management of the properties. Owners and co-hosts may have different responsibilities, powers, and access to property listings. A tailored user experience, and/or notifications and alerts need to be provided based on access permissions.

SUMMARY

Technical solutions for more personalized, dynamic, accurate, and timely management of co-hosts in online marketplaces are therefore generally desired.

The disclosed embodiments provide a method for host management in an online marketplace. The method includes obtaining a property listing listed on the online marketplace. The method may also include providing a host management graphical user interface for managing co-hosts for the property listing. The host management graphical user interface may enable multi-user, multi-tenant, and/or concurrent modification of underlying data and/or graphical elements. The method may also include, in accordance with a determination that the property listing is associated with one or more co-hosts, displaying, on a host management graphical user interface, one or more host detail affordances, each host detail affordance corresponding to a respective co-host of the one or more co-hosts. Each co-host may be a tenant of a multi-tenant network system. Each co-host may be a user of multi-user system. The method may also include, in response to detecting, on the host management graphical user interface, a user selecting a first host detail affordance corresponding to a first co-host, displaying, on the host management graphical user interface, permissions, payouts, and activity log, for the first co-host. The method may also include, in accordance with a determination that the property listing is not associated with one or more co-hosts, displaying, on the host management graphical user interface, a co-host add option to add a co-host for the property listing. The method may also include, in response to detecting, on the host management graphical user interface, an input from the user, to select the co-host add option, allowing the user to specify a new co-host and associating the new co-host with the property listing.

In some embodiments, the method may further include displaying a plurality of tabs on the host management graphical user interface, including tabs for (i) details of the property listing, (ii) settings for bookings for the property listing, and (iii) co-hosts to the property listing. The method may also include, in response to detecting, on the host management graphical user interface, the user selecting the tab for co-hosts, either displaying, on the host management graphical user interface, the one or more host detail affordances and/or the co-host add option to add a co-host for the property listing.

In some embodiments, the method may further include displaying, on the host management graphical user interface, a permission edit option to set or edit permissions for the first co-host. The method may also include, in response to detecting, on the host management graphical user interface, the user selecting the permission edit option, displaying, on the host management graphical user interface, a permission pop-up overlay that shows a plurality of permission options for setting or editing permissions for the first co-host. The method may also include, in response to detecting, on the host management graphical user interface, the user selecting a permission option of the plurality of permission options, (i) updating the permissions the first co-host, and (ii) updating the host management graphical user interface to indicate a change in the permissions for the first co-host. In some embodiments, the plurality of permission options include full access, calendar and inbox access, and calendar access. The calendar access provides access to view calendar information for the property listing. The calendar and inbox access provides access to view calendar information and mail information for the property listing, and one or more messaging options to message one or more guests of the property listing. The full access provides access to pricing information, view and edit calendar and inbox for the property listing, the one or more messaging options, and one or more management options to manage views of the property listing. In some embodiments, in response to detecting, on the host management graphical user interface, the user selecting the permission option of the plurality of permission options, the method may further include allowing the user to associate a time limit for the permission option and updating the host management graphical user interface to indicate the time limit in the permissions for the first co-host.

In some embodiments, the method may further include, in accordance with a determination that the user is an owner of the property listing, (i) allowing the user to update payouts for the first co-host, via the host management graphical user interface; (ii) associating the first co-host with the updated payouts; and (iii) updating the host management graphical user interface to display the updated payouts for the first co-host. In some embodiments, allowing the user to change payouts comprises displaying a plurality of payout options for payouts including (i) a percentage value for total booking revenue and (ii) a fixed amount. In some embodiments, the method may further include displaying, on the host management graphical user interface, a confirm option to confirm the updated payouts with the first co-host. The method may also include, in response to detecting, on the host management graphical user interface, a selection of the confirm option, sending a request to the first co-host to confirm the updated payouts. The method may also include, in response to receiving a response from the first co-host to confirm the updated payouts, associating the first co-host with the updated payouts. The method may also include updating the host management graphical user interface to display the updated payouts for the co-host.

In some embodiments, the method may further include, in response to detecting, on the host management graphical user interface, the user selecting the first host detail affordance corresponding to the first co-host, displaying, on the host management graphical user interface, a primary host option to update status of the first co-host as a primary host (e.g., a guest point of contact for hosting). The method may also include, in response to detecting, on the host management graphical user interface, the user selecting the primary host option, allowing the user to update the status of the first co-host as a primary host, and updating the host management graphical user interface to indicate the update.

In some embodiments, the method may further include, displaying, on the host management graphical user interface, pending invitations to other users to be added as a co-host.

In some embodiments, the method may further include, in accordance with a determination that the user is a co-host for the property listing, allowing the user, via the host management graphical user interface, to remove self from co-hosting the property listing, updating co-hosts for the property listing. The method may also include updating the host management graphical user interface to cease displaying the property listing for the user and/or cease the capability to manage the property listing.

In some embodiments, the method may further include, displaying, on the host management graphical user interface, the co-host add option, in accordance with a determination that the user is an owner or a full access co-host of the property listing.

In some embodiments, the method may further include, in accordance with a determination that the user is an owner of the property listing, providing a stop payout option on the host management graphical user interface, to stop payouts to the one or more co-hosts.

In some embodiments, the method may further include, in accordance with a determination that the user is a full-access co-host responsible for end-to-end listing management, providing, to the user, access to pricing information, view and edit calendar and inbox for the property listing, one or more messaging options to message one or more guests of the property listing, one or more management options to manage views of the property listing, and corresponding notifications, except for personal profile information and financial details of one or more owners of the property listing. Full access co-hosts may access the transaction history of their hosted listings.

In some embodiments, the method may further include, in accordance with a determination that the user is an inbox and calendar only co-host responsible for handling on-trip guest support, providing, to the user, access to calendar and inbox access provides access to view limited calendar information and mail information for the property listing, one or more messaging options to message one or more guests of the property listing, and corresponding notifications, for the property listing. Pricing information and/or guest information may not be visible to this type of co-hosts.

In some embodiments, the method may further include, in accordance with a determination that the user is calendar only co-host responsible for handling support tasks, providing, to the user, access to view calendar information and corresponding notifications, for the property listing.

In some embodiments, the method may further include (i) associating a respective permission level of a plurality of permission levels for one or more co-hosts of the property listing, and (ii) updating activity log for each co-host based on their respective permission level.

In some embodiments, the host management user interface includes one or more user interface surfaces. The method may further include (i) associating a respective permission level of a plurality of permission levels for one or more co-hosts of the property listing, and (ii) showing or hiding at least one surface of the one or more surfaces based on permission levels for one or more co-hosts of the property listing.

In some embodiments, the method may further include (i) associating a respective permission level of a plurality of permission levels for one or more co-hosts of the property listing, (ii) using a notification customization library to control notifications for the one or more co-hosts based on particular permission levels, and/or (iii) a user interface customization library to control user interface portions to hide or to show for co-hosts based on permission levels. Some embodiments may include a resource association framework that maintains access association between resources (e.g., listings, reservations, message threads, claims, etc.) and the co-hosts. Some embodiments may update the access association in real-time based on any change to co-host/host relationships, and/or maintain permission consistency.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Figure 1:
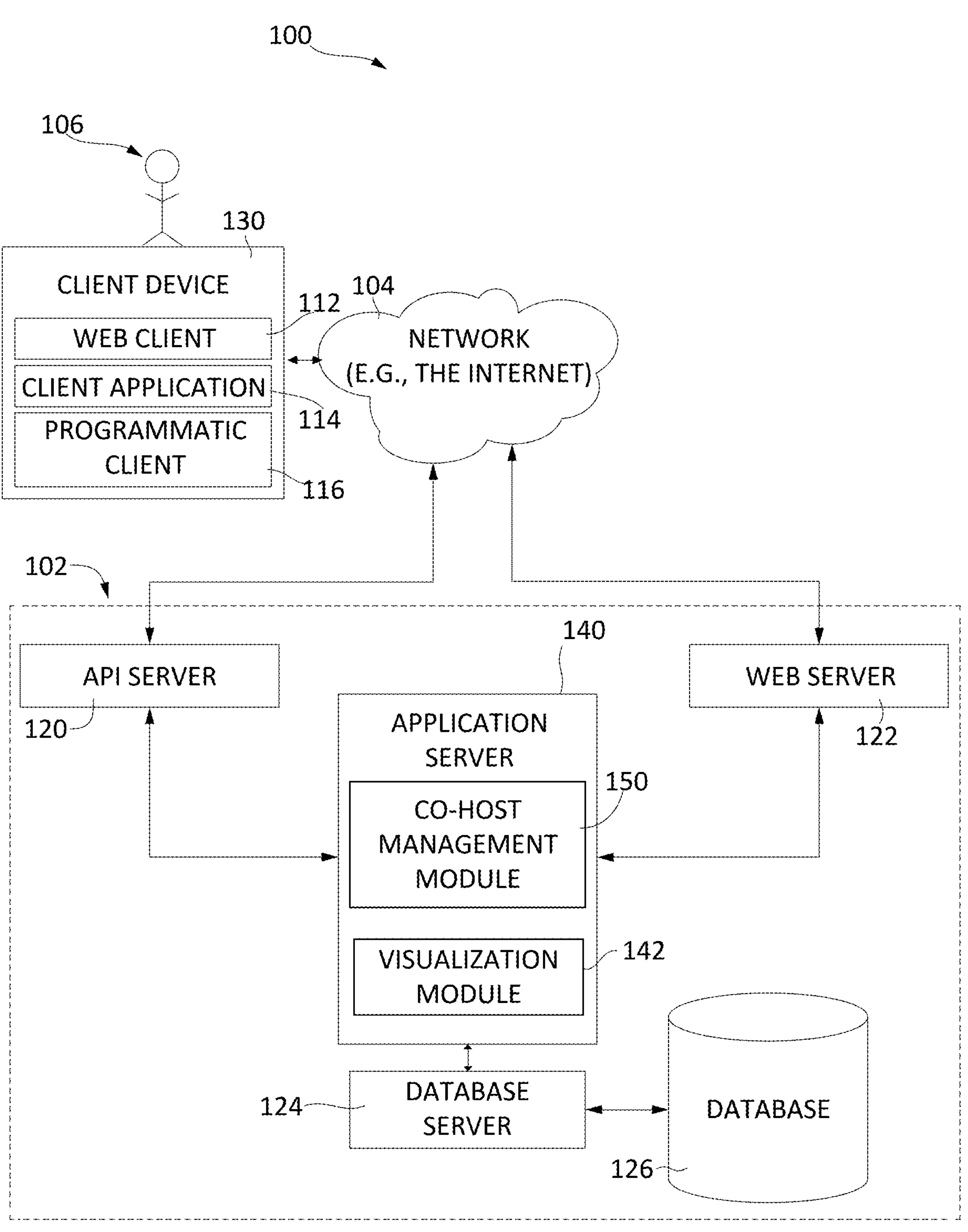
FIG. 1 is a block diagram illustrating an exemplary host management system implemented in a networked environment, in accordance with some embodiments.

FIG. 1 shows a block diagram of a network architecture 100 for an optimized search system according to some embodiments. FIG. 1 illustrates, for example, a web client 112 (e.g., a browser), client application(s) 114, and a programmatic client 116 executing on a client device 130. The client device 130 includes a web client 112, client application(s) 114, and a programmatic client 116 alone, together, or in any suitable combination. Although FIG. 1 shows one client device 130, in some embodiments, the network architecture 100 comprises multiple client devices.

In some embodiments, the client device 130 comprises a computing device that includes at least a display and communication capabilities that provide access to a networked system 102 via a network 104. The client device 130 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra-book, netbook, laptop, desktop, multi-processor system, microprocessor-based or programmable consumer electronic, game consoles, set-top box (STB), network personal computer (PC), mini-computer, and so forth. In some embodiments, the client device 130 comprises one or more of a touch screens, accelerometer, gyroscope, biometric sensor, camera, microphone, Global Positioning System (GPS) device, and the like.

The client device 130 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In some embodiments, the client device 130 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays at hotels, motels, or residences managed by other end-users (e.g., a posting end-user who owns a home and rents out the entire home or private room). In some embodiments, the client application(s) 114 include various components operable to present information to the user and communicate with the networked system 102. In some embodiments, if an e-commerce site application is included in the client device 130, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the e-commerce site application is not included in the client device 130, the client device 130 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via a programmatic interface provided by an Application Program Interface (API) server 120.

Users (e.g., user 106) comprise a person, a machine, or other means of interacting with the client device 130. In some embodiments, the user 106 is not part of the network architecture 100, but interacts with the network architecture 100 via the client device 130 or another means. For instance, the user 106 provides input (e.g., touch screen input or alphanumeric input) to the client device 130 and the input is communicated to the networked system 102 via the network 104. In this instance, the networked system 102, in response to receiving the input from the user 106, communicates information to the client device 130 via the network 104 to be presented to the user 106. In this way, the user 106 can interact with the networked system 102 using the client device 130.

The API server 120 and the web server 122 are coupled to, and provide programmatic and web interfaces respectively to, one or more application server(s) 140. The application server 140 is configured to respond to host management requests from a client device 130. The client device 130 may be used by any user (e.g., owner(s), co-host(s), primary host(s)).

The application server(s) 140 include a co-host management module 150 manage co-hosts in an online marketplace. The application server(s) 140 also include a visualization module 142 to generate and/or display visualizations in a graphical user interface. Property listings, co-hosts, owners, categories or attributes of properties, visualizations, related parameters, and/or user preferences may be stored as part of the co-host management module 150 and/or the visualization module 142. These modules may comprise one or more modules or applications and each of which can be embodied as hardware, software, firmware, or any combination thereof to facilitate optimizing the search results for the client device 130. The application server(s) 140 are, in turn, shown to be coupled to one or more database server(s) 124 that facilitate access to one or more information storage repositories or database(s) 126. In some embodiments, the database(s) 126 are storage devices that store information to be posted (e.g., inventory, image data, catalog data, feature vectors) to the visualization module 142, and/or the co-host management module 150. The database(s) 126 also stores digital goods information in accordance with some embodiments. The co-host management module 150 may manage, store and/or retrieve co-host lists, property listings, payouts for properties, permission levels, user preferences, historical usage data, categories and/or attributes for properties (e.g., locations, names, ratings), availability of properties. The visualization module 142 may manage, store and/or retrieve user interface properties (e.g., a mobile phone has a different screen size, dimensions and/or form factor when compared to a desktop) and/or parameters, property cards, process user inputs received via graphical user interfaces, overlays, images and/or thumbnail images for users, properties, icons and/or affordances, maps, and/or user preferences, preferences of users of the online marketplace, historical usage data for visualizations and displays. Operations of the modules are described below in reference to FIGS. 4-8, according to one or more embodiments.

While the network architecture 100 shown in FIG. 1 employs a client-server architecture, the present inventive subject matter is, of course, not limited to such an architecture, and can equally be implemented in a distributed, or peer-to-peer, architecture system, for example. The various components of the applications server(s) 140 (e.g., the visualization module 142, and/or the co-host management module 150) may also be implemented as standalone software programs, which do not necessarily have networking capabilities.

Although the modules are shown in FIG. 1 as components of the networked system 102, it will be appreciated that, in alternative embodiments, each may be a component in a web service that is separate and distinct from the networked system 102. The visualization module 142, and/or the co-host management module 150, can each be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124.

Figure 2:
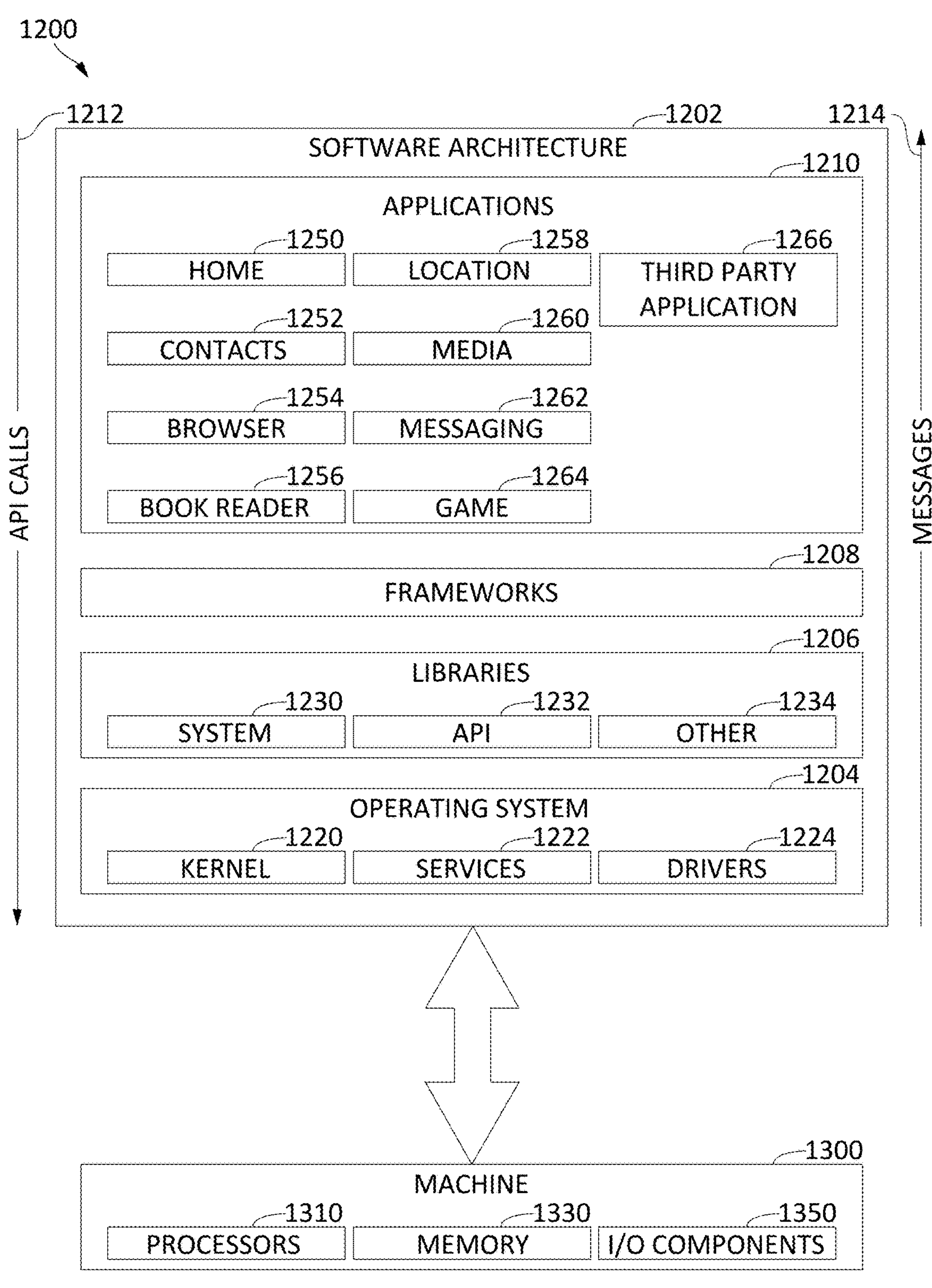
FIG. 2 is a block diagram illustrating the architecture of software used to implement the host management system, according to some embodiments.

FIG. 2 is a block diagram 200 illustrating an architecture of software 202, which can be installed on any one or more of the devices described above. FIG. 2 is merely a non-limiting example of a software architecture, and it will be appreciated that many other architectures can be implemented to facilitate the functionality described herein. In various embodiments, software 202 is implemented by hardware such as a machine 300 (further described in FIG. 3) that includes processors 310, memory 330, and input/output (I/O) components 350. In this example architecture, the software 202 can be conceptualized as a stack of layers where each layer may provide a particular functionality. For example, the software 202 includes layers such as an operating system 204, libraries 206, frameworks 208, and applications 210. Operationally, the applications 210 invoke API calls 212 through the software stack and receive messages 214 in response to the API calls 212, consistent with some embodiments.

In various embodiments, the operating system 204 manages hardware resources and provides common services. The operating system 204 includes, for example, a kernel 220, services 222, and drivers 224. The kernel 120 acts as an abstraction layer between the hardware and the other software layers, consistent with some embodiments. For example, the kernel 220 provides memory management, processor management (e.g., scheduling), component management, networking, and security settings, among other functionalities. The services 222 can provide other common services for the other software layers. The drivers 224 are responsible for controlling or interfacing with the underlying hardware, according to some embodiments. For instance, the drivers 224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 206 provide a low-level common infrastructure utilized by the applications 210. The libraries 206 can include system libraries 230 (e.g., C standard library) that can provide functions such as memory allocation functions, string manipulation functions, mathematic functions, and the like. In addition, the libraries 206 can include API libraries 232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 206 can also include a wide variety of other libraries 234 to provide many other APIs to the applications 210.

The frameworks 208 provide a high-level common infrastructure that can be utilized by the applications 210, according to some embodiments. For example, the frameworks 208 provide various graphic user interface (GUI) functions, high-level resource management, high-level location services, and so forth. The frameworks 208 can provide a broad spectrum of other APIs that can be utilized by the applications 210, some of which may be specific to a particular operating system or platform.

In some embodiments, the applications 210 include a home application 250, a contacts application 252, a browser application 254, a book reader application 256, a location application 258, a media application 260, a messaging application 262, a game application 264, and/or a broad assortment of other applications, such as a third-party application 266. According to some embodiments, the applications 210 are programs that execute functions defined in the programs. Various programming languages can be employed to create one or more of the applications 210, structured in a variety of manners, such as object-oriented programming languages (e.g., Objective-C, Java, or C++) or procedural programming languages (e.g., C or assembly language). In a specific example, the third-party application 266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 266 can invoke the API calls 212 provided by the operating system 204 to facilitate the functionality described herein.

Figure 3:
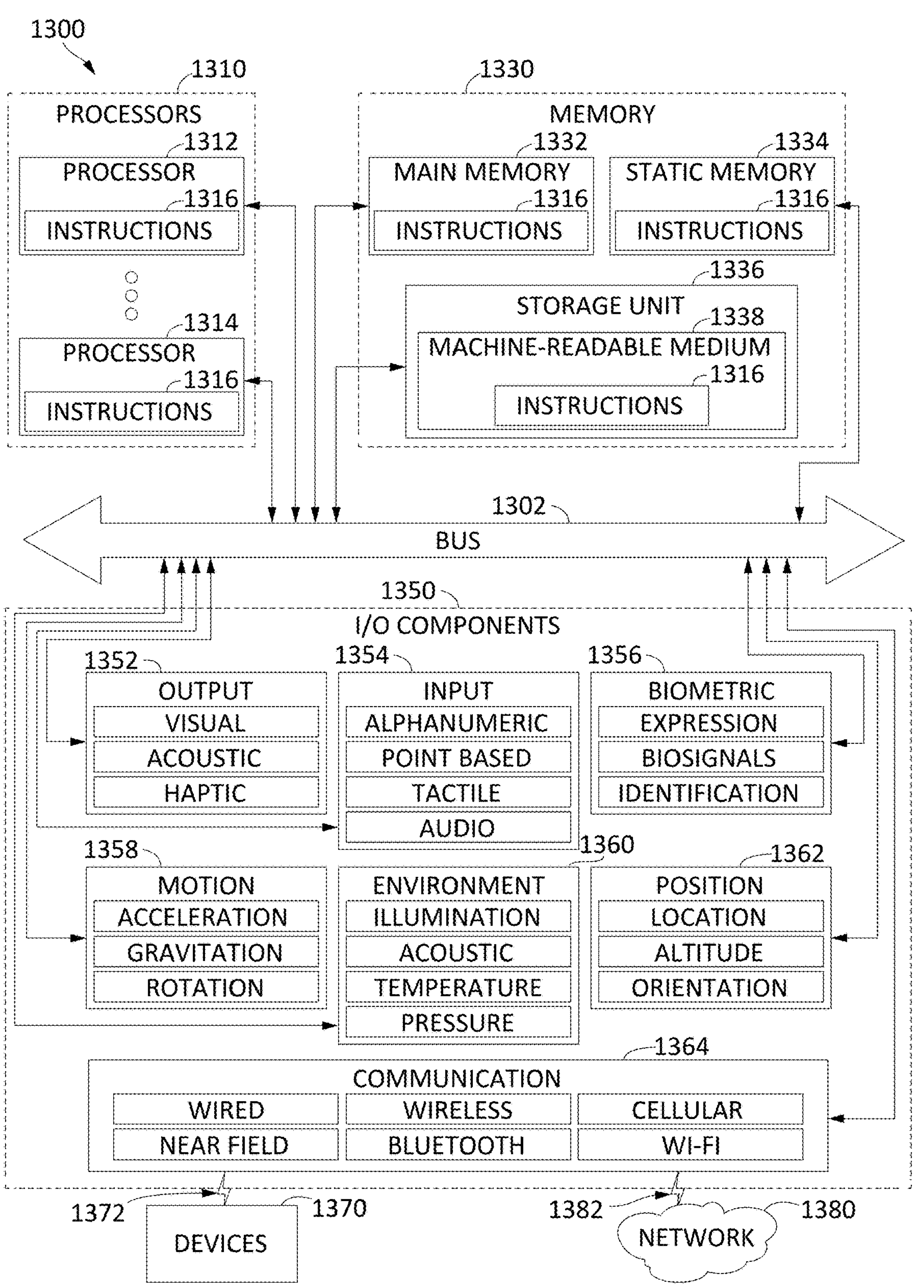
FIG. 3 shows a machine as an example computer system with instructions to cause the machine to implement the host management system, according to some embodiments.

FIG. 3 illustrates a diagrammatic representation of a machine 300 in the form of a computer system within which a set of instructions may be executed for causing the machine to perform any one or more of the methodologies discussed herein, according to some embodiments. Specifically, FIG. 3 shows a diagrammatic representation of the machine 300 in the example form of a computer system, within which instructions 316 (e.g., software, a program, an application, an applet, an app, or other executable code) for causing the machine 300 to perform any one or more of the methodologies discussed herein may be executed. The instructions 316 transform the general, non-programmed machine 300 into a particular machine 300 programmed to carry out the described and illustrated functions in the manner described. In alternative embodiments, the machine 300 operates as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a PC, a tablet computer, a laptop computer, a netbook, an STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 316, sequentially or otherwise, that specify actions to be taken by the machine 300. Further, while only a single machine 300 is illustrated, the term "machine" shall also be taken to include a collection of machines 300 that individually or jointly execute the instructions 316 to perform any one or more of the methodologies discussed herein.

The machine 300 may include processors 310, memory 330, and I/O components 350, which may be configured to communicate with each other such as via a bus 302. In some embodiments, the processors 310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 312 and a processor 314 that may execute the instructions 316. The term "processor" is intended to include multi-core processors that may comprise two or more independent processors (sometimes referred to as "cores") that may execute instructions contemporaneously. Although FIG. 3 shows multiple processors 310, the machine 300 may include a single processor with a single core, a single processor with multiple cores (e.g., a multi-core processor), multiple processors with a single core, multiple processors with multiples cores, or any combination thereof.

The memory 330 may include a main memory 332, a static memory 334, and a storage unit 336, all accessible to the processors 310 such as via the bus 302. The main memory 332, the static memory 334, and storage unit 336 store the instructions 316 embodying any one or more of the methodologies or functions described herein. The instructions 316 may also reside, completely or partially, within the main memory 332, within the static memory 334, within the storage unit 336, within at least one of the processors 310 (e.g., within the processor's cache memory), or any suitable combination thereof, during execution thereof by the machine 300.

The I/O components 350 may include a wide variety of components to receive input, provide output, produce output, transmit information, exchange information, capture measurements, and so on. The specific I/O components 350 that are included in a particular machine will depend on the type of machine. For example, portable machines such as mobile phones will likely include a touch input device or other such input mechanisms, while a headless server machine will likely not include such a touch input device. It will be appreciated that the I/O components 350 may include many other components that are not shown in FIG. 3. The I/O components 350 are grouped according to functionality merely for simplifying the following discussion and the grouping is in no way limiting. In various embodiments, the I/O components 350 may include output components 352 and input components 354. The output components 352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 350 may include biometric components 356, motion components 358, environmental components 360, or position components 362, among a wide array of other components. For example, the biometric components 356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored only with user approval and deleted on user request. Further, such biometric data may be used for limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information. The motion components 358 may include acceleration sensor components (e.g., accelerometer), gravitation sensor components, rotation sensor components (e.g., gyroscope), and so forth. The environmental components 360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 350 may include communication components 364 operable to couple the machine 300 to a network 380 or devices 370 via a coupling 382 and a coupling 372, respectively. For example, the communication components 364 may include a network interface component or another suitable device to interface with the network 380. In further examples, the communication components 364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 370 may be another machine or any of a wide variety of peripheral devices (e.g., a peripheral device coupled via a USB).

Moreover, the communication components 364 may detect identifiers or include components operable to detect identifiers. For example, the communication components 364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 364, such as location via Internet Protocol (IP) geolocation, location via Wi-Fi® signal triangulation, location via detecting an NFC beacon signal that may indicate a particular location, and so forth.

The various memories (i.e., 330, 332, 334, and/or memory of the processor(s) 310) and/or storage unit 336 may store one or more sets of instructions and data structures (e.g., software) embodying or utilized by any one or more of the methodologies or functions described herein. These instructions (e.g., the instructions 316), when executed by processor(s) 310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 380 may be an ad hoc network, an intranet, an extranet, a VPN, an LAN, a WLAN, a WAN, a WWAN, an MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 380 or a portion of the network 380 may include a wireless or cellular network, and the coupling 382 may be a Code Division Multiple Access (CDMA) connection, a Global System for Mobile communications (GSM) connection, or another type of cellular or wireless coupling. In this example, the coupling 382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 316 may be transmitted or received over the network 380 using a transmission medium via a network interface device (e.g., a network interface component included in the communication components 364) and utilizing any one of a number of well-known transfer protocols (e.g., hypertext transfer protocol (HTTP)). Similarly, the instructions 316 may be transmitted or received using a transmission medium via the coupling 372 (e.g., a peer-to-peer coupling) to the devices 370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 316 for execution by the machine 300, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Some embodiments enable users of the online marketplace to set a plurality of permissions for co-hosts. A first permission level may grant full access. A full access co-host may be a co-host that is a partner. Full access co-hosts may have access similar to owners without access to financial and transaction data that may be personal to owners. A second permission level may include inbox and calendar access, which basically gives access to email inboxes and/or calendars. This may be useful for entrusting users to do guest interface for a main host or an owner on their behalf, but does not grant access to change a listing or pricing. This permission level may allow users to have access to the calendar so they know when guests are checking in and out. Inbox access may allow users to interface with guests directly. A third permission level may be calendar only. Calendar only co-hosts may only have access to calendar. In some embodiments, these co-hosts have access to only a limited subset of calendar (e.g., when guests are checking in and out). These co-hosts may not have access to pricing within the calendar Some embodiments allow hosts to perform on-platform payouts to co-hosts. This allows users to pay on the platform, or while using the online marketplace, rather than via offline payment methods (e.g., Venmo, PayPal). Some embodiments enable users to set up co-host payouts on-platform. Co-hosts can choose to pay a percentage of booking, and/or a fixed fee. Suppose a host is working with a property manager and the host wants to add them as their co-host on their listing, the host could pay a commission via the percentage of booking payout capability. Payouts may be made to service providers, like a cleaner for example. The payouts may be set to pay a fixed amount (e.g., $150) every time that they clean the house, so that the cleaner is paid that amount with every booking.

Figure 4A:
FIG. 4A illustrates an example user interface for host management in an online marketplace, according to some embodiments.

FIG. 4A illustrates an example user interface 400 (e.g., a mobile application user interface, a web browser user interface) for host management in an online marketplace, according to some embodiments. A host may use this interface to invite a co-host for a property listing 412. The interface may include a tab 414 for showing details of the listing, a tab 416 for booking settings, and a tab for co-hosts 418. The interface as shown may be viewed under the co-hosts tab. An affordance 420 may be provided to invite a co-host. A co-host may help a host with everything from managing a calendar for a property listing to welcoming guests to a property, depending on permission levels.

Figure 4B:
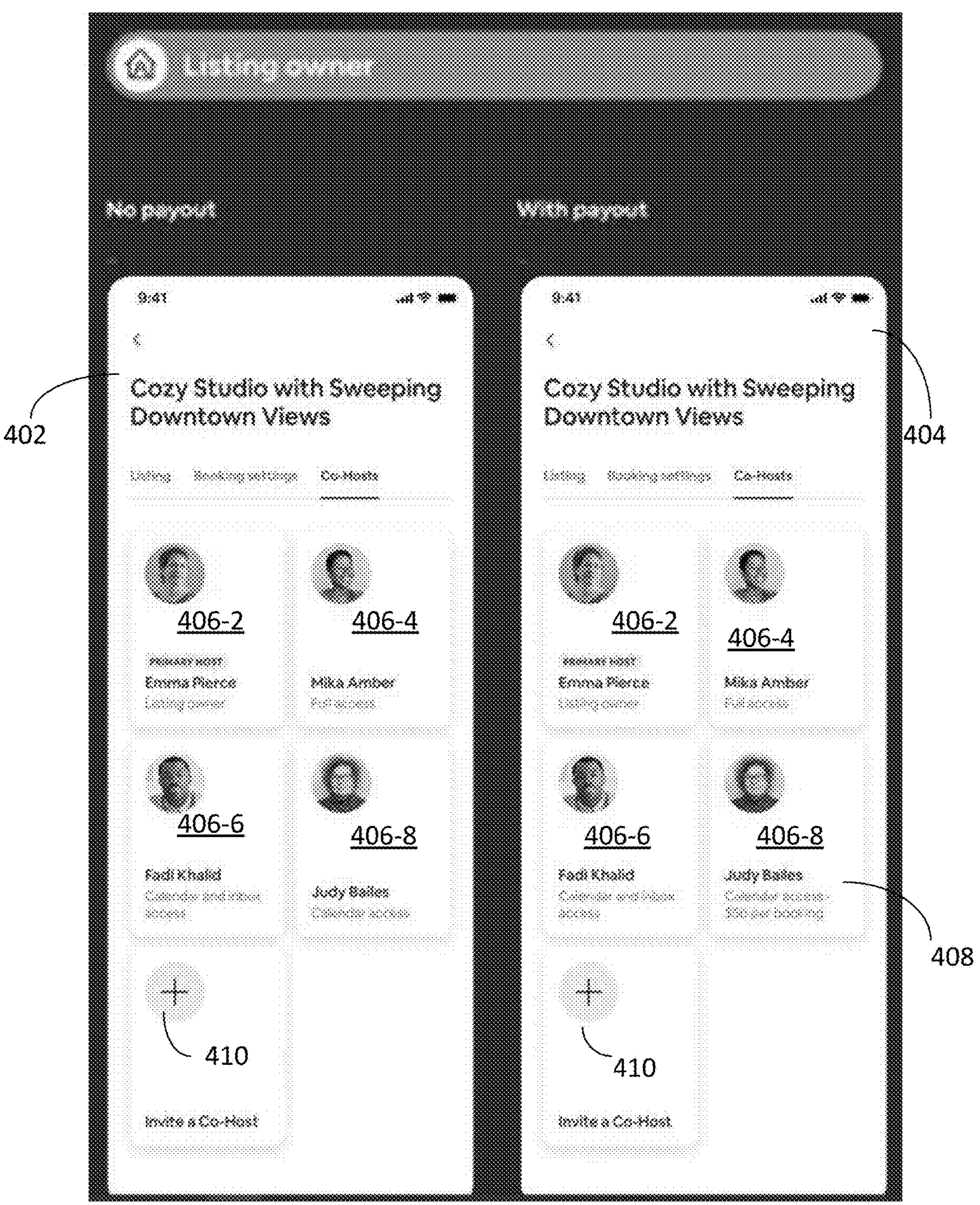
FIG. 4B shows views of the example user interface of FIG. 4A for a listing owner, according to some embodiments.

FIG. 4B shows views of the example user interface 400 for a listing owner, according to some embodiments. Both views show cards for four co-hosts 406-2, 406-4, 406-6 and 406-8. The example interface shown in FIG. 4A may be used to invite the co-hosts, so the co-hosts shown in the example may have been invited previously using that interface. An owner may initiate the first invitation. The co-host 406-2 is a primary host, the co-host 406-4 is a full access co-host, the co-host 406-6 is a calendar and inbox access co-host, and the co-host 406-8 is a calendar access co-host. The view 402 corresponds to an example with no payout support, and the view 404 corresponds to an example with payout support ("$50 per booking") is shown in additional text 408 in the card for the co-host 406-8. Some embodiments show an affordance or a card 410 for inviting co-hosts.

Figure 4C:
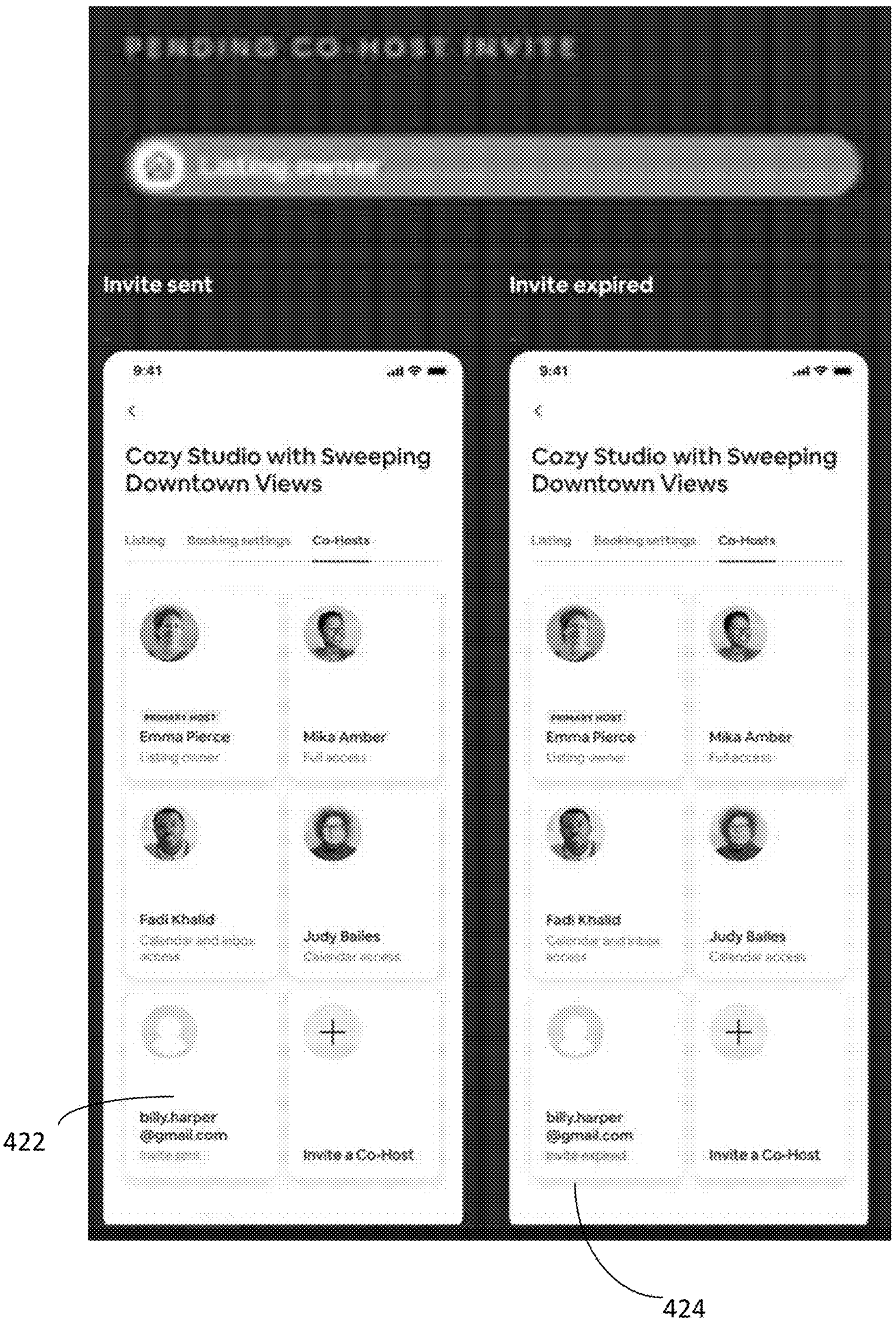
FIG. 4C shows views of the example user interface of FIG. 4A for a listing owner, according to some embodiments.

FIG. 4C shows views of the example user interface 400 for a listing owner, according to some embodiments. The view on the left indicates in a pending co-host card that an invite has been sent (text 422). The view on the right indicates in the pending co-host card that the invite has expired (text 424). The system may track invites sent to users and expiration of the invitations, and updates the user interface accordingly.

Figure 4D:
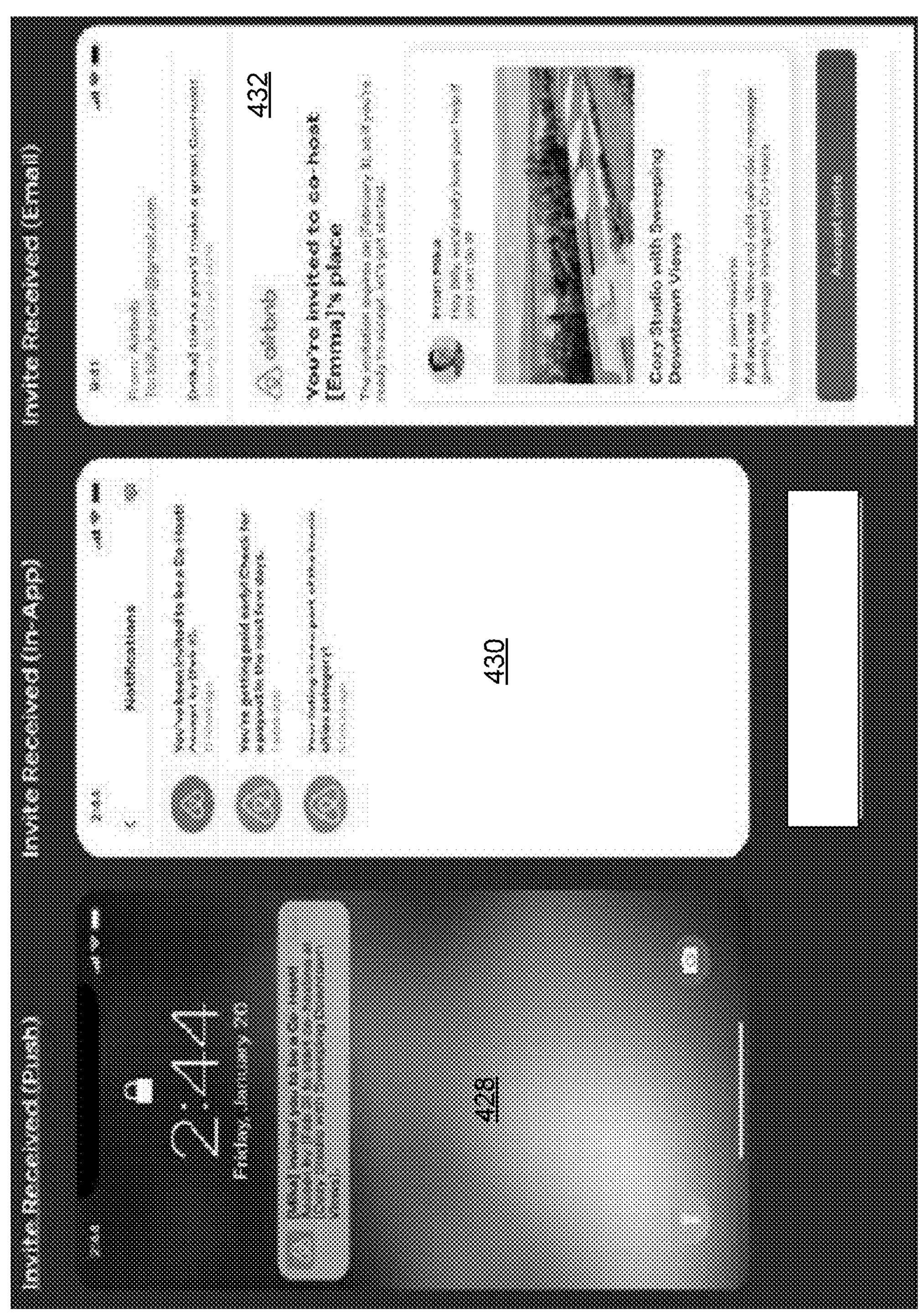
FIG. 4D shows example notifications, according to some embodiments.

FIG. 4D shows example notifications 426, according to some embodiments. A co-host who is invited may receive a notification 428 on a home screen of a mobile phone or a desktop if such notifications are allowed. The co-host may be able to review notifications 430 from within an application. The co-host may be able to receive an email notification 432. The example shows notifications for an invitation to be a co-host. Similar notifications may be generated and/or displayed according to roles of a user.

Figure 5A:
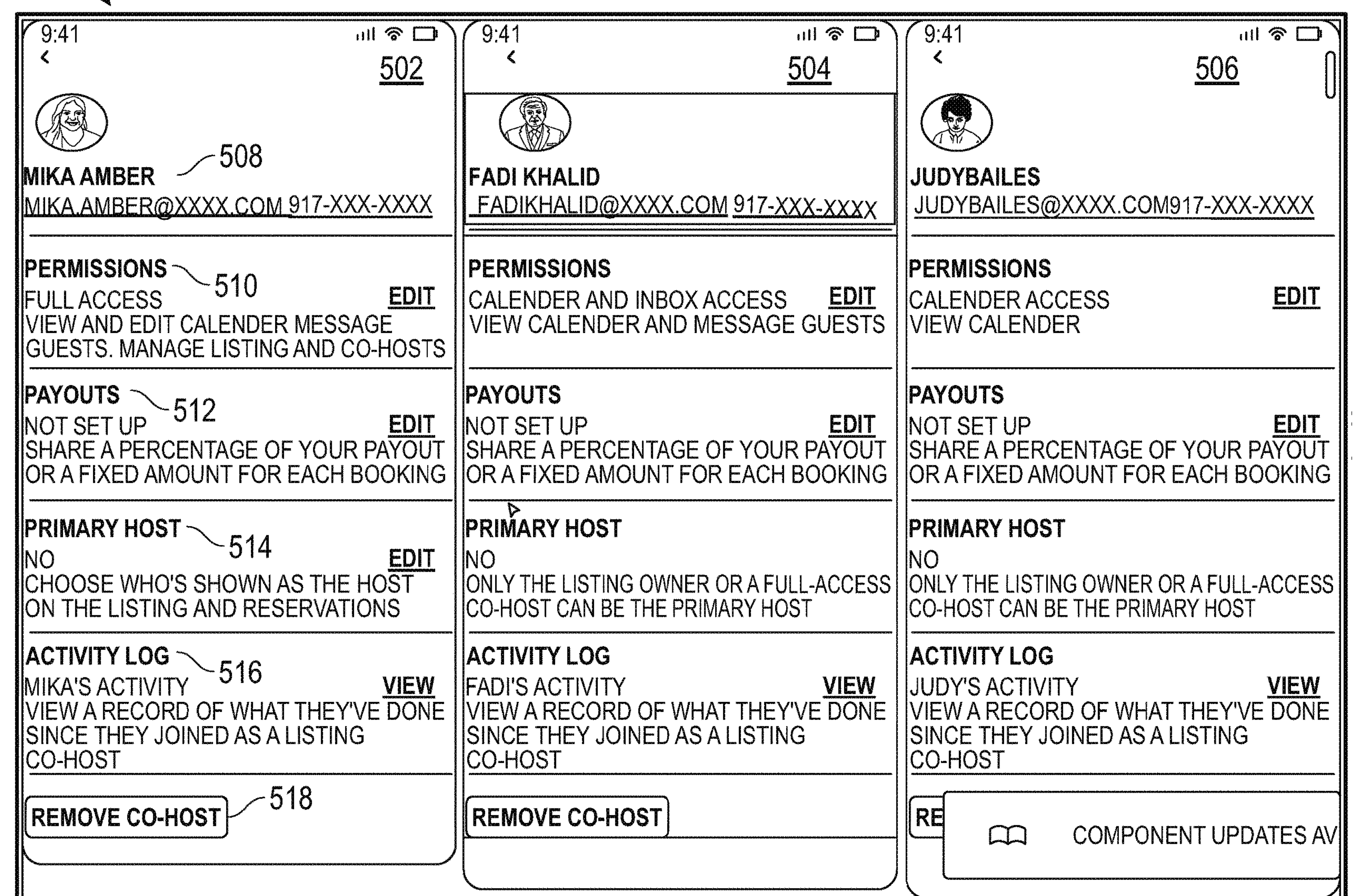
FIG. 5A illustrates views of an example user interface for host management in an online marketplace, according to some embodiments.

FIG. 5A illustrates views of an example user interface 500 (e.g., a mobile application user interface, a web browser user interface) for host management in an online marketplace, according to some embodiments. Views 502, 504 and 506 correspond to different co-hosts. Each view displays information relevant to the co-host. The information may include name and/or contact information 508, permission level 510, payouts 512, whether the co-host is a primary host 514, and/or activity log 516. Some embodiments also include an affordance 518 to remove the user from co-hosting the property.

Figure 5B:
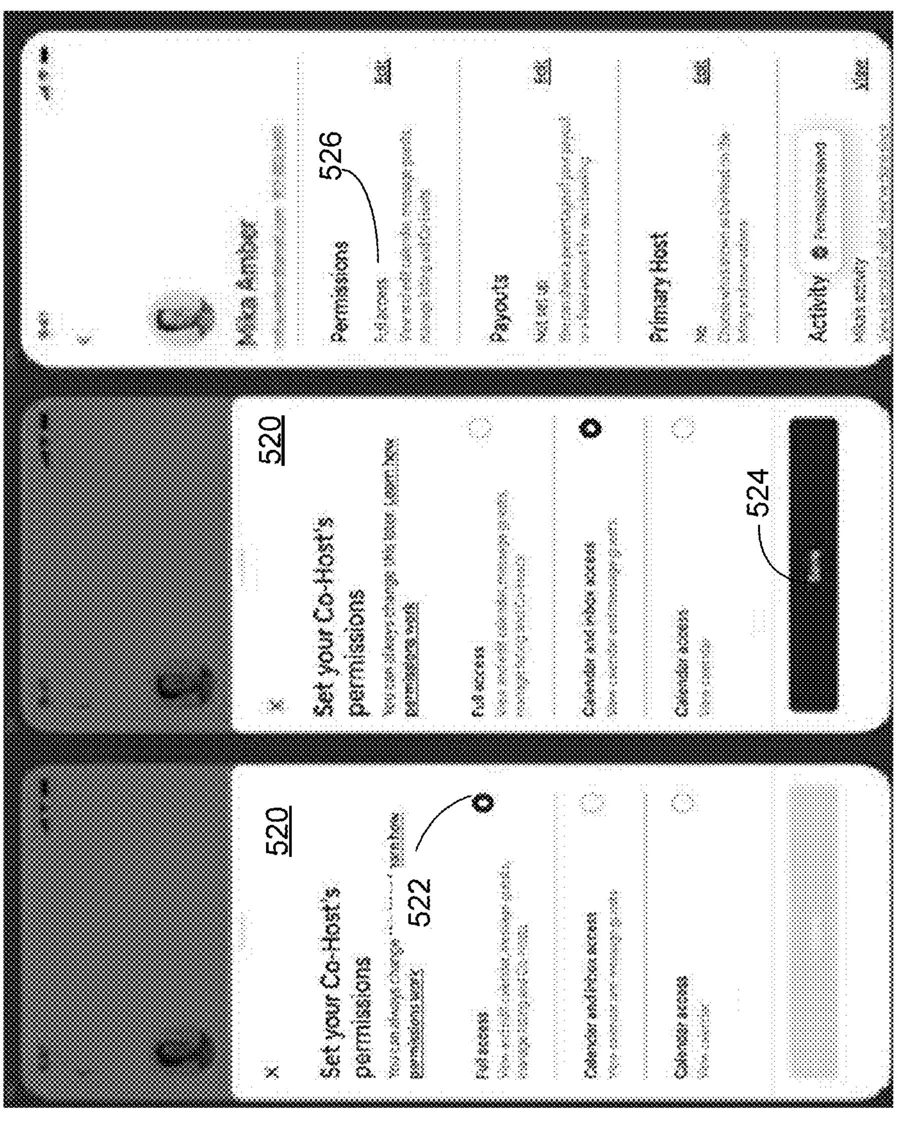
FIG. 5B shows views of the example user interface of FIG. 5A for setting co-host permissions, according to some embodiments.

FIG. 5B shows views of the example user interface 500 for setting co-host permissions, according to some embodiments. In some embodiments, a permissions overlay 520 may be shown for a user (e.g., an owner) that includes affordances (e.g., button 522) to set a co-host's permissions. Another affordance 524 may be provided for the user to save the permissions. After the user saves the permissions level for the co-host, the permissions may be updated 526 in the co-host management interface. Permission options or permission levels (sometimes referred to as permissions) may include full access, calendar and inbox access, and calendar access. The calendar access may provide access to view calendar information for the property listing. The calendar and inbox access may provide access to view calendar information and mail information for the property listing, and one or more messaging options to message one or more guests of the property listing. The full access may provide access to pricing information, view and edit calendar and inbox for the property listing, the one or more messaging options, and one or more management options to manage views of the property listing.

In some embodiments, user interface surfaces may be shown or hidden from users depending on the permission levels. Some embodiments may include a user interface customization library associated with the surfaces. In some embodiments, each surface may be displayed using an associated library, to provide customization on the server side. The customization library may control the consistency for client platforms, such as web, iOS, Android. Some embodiments may provide a set of APIs to fetch information for hosted listings.

Figure 5C:
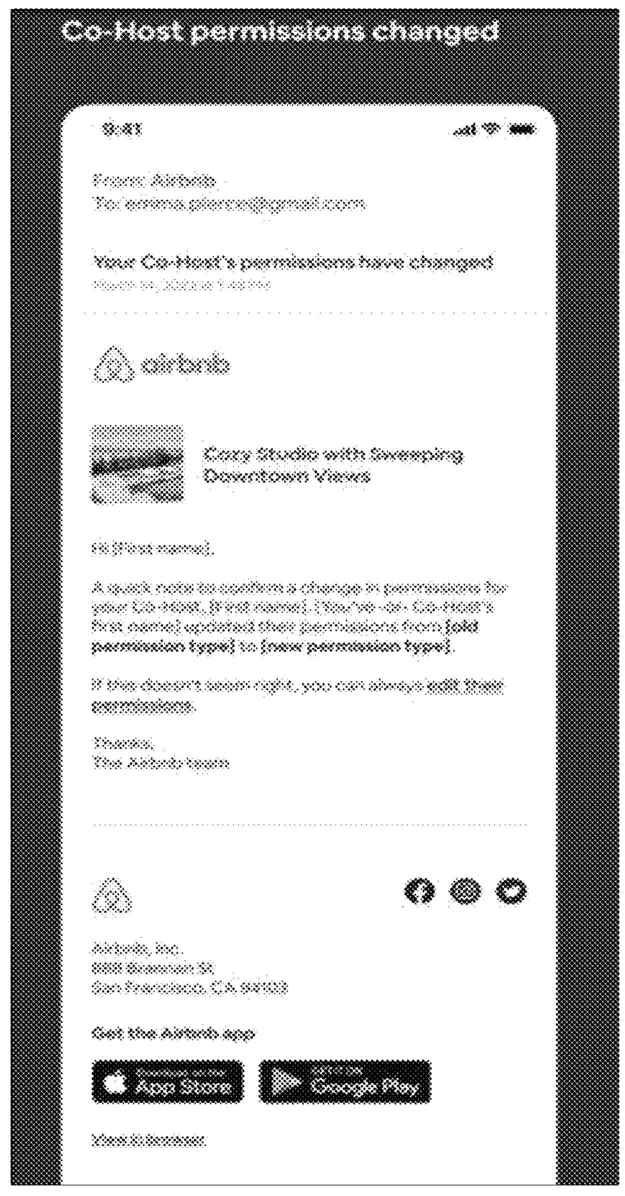
FIG. 5C shows an example notification generated by the system, according to some embodiments.

FIG. 5C shows an example notification 528 generated by the system, according to some embodiments. After an owner updates the permissions of a co-host, as described above in reference to FIG. 5B, the system may generate a notification (e.g., an e-mail) for the co-host indicating that the owner has updated their permissions.

Figure 5D:
FIG. 5D shows a view of the example user interface of FIG. 5A for an owner, according to some embodiments.
Figure 5D:
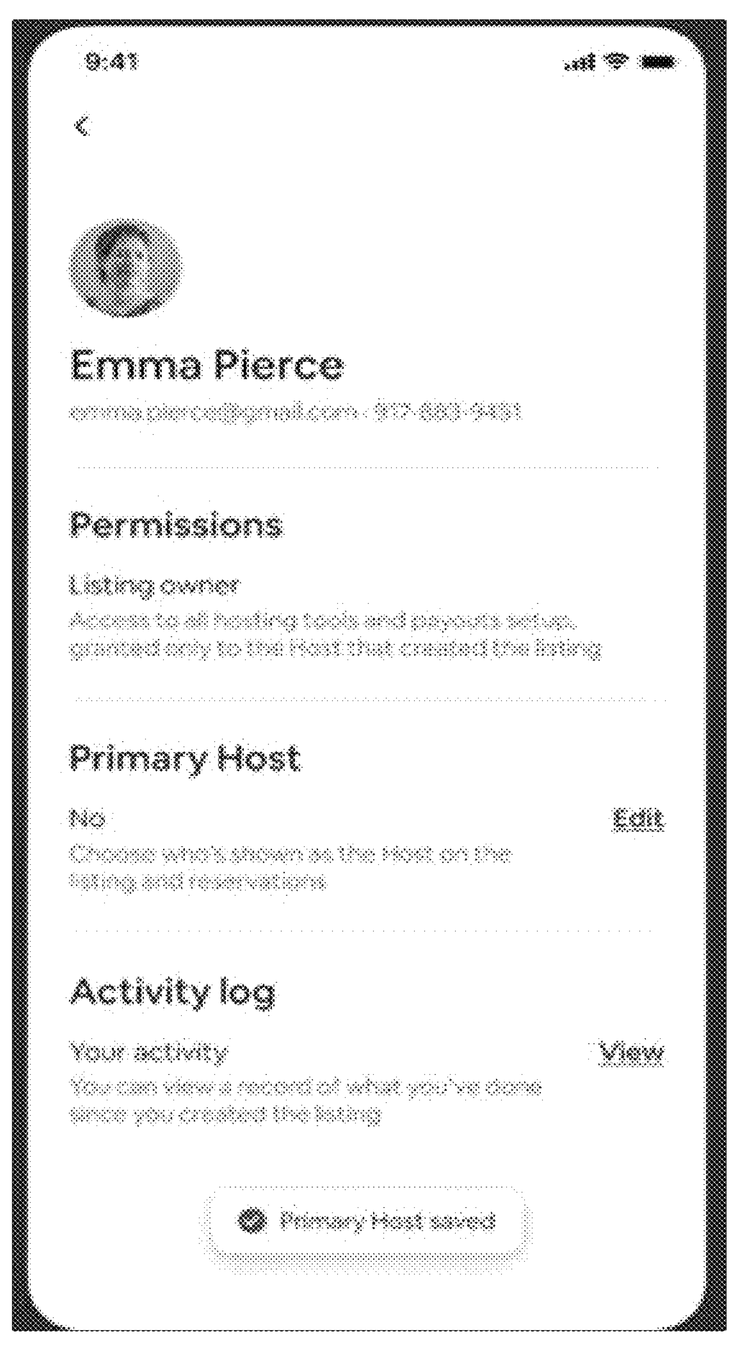

FIG. 5D shows a view 530 of the example user interface 500 for an owner, according to some embodiments. After a co-host has been promoted to a primary host, the owner can edit their own status as a primary host.

Figure 5E:
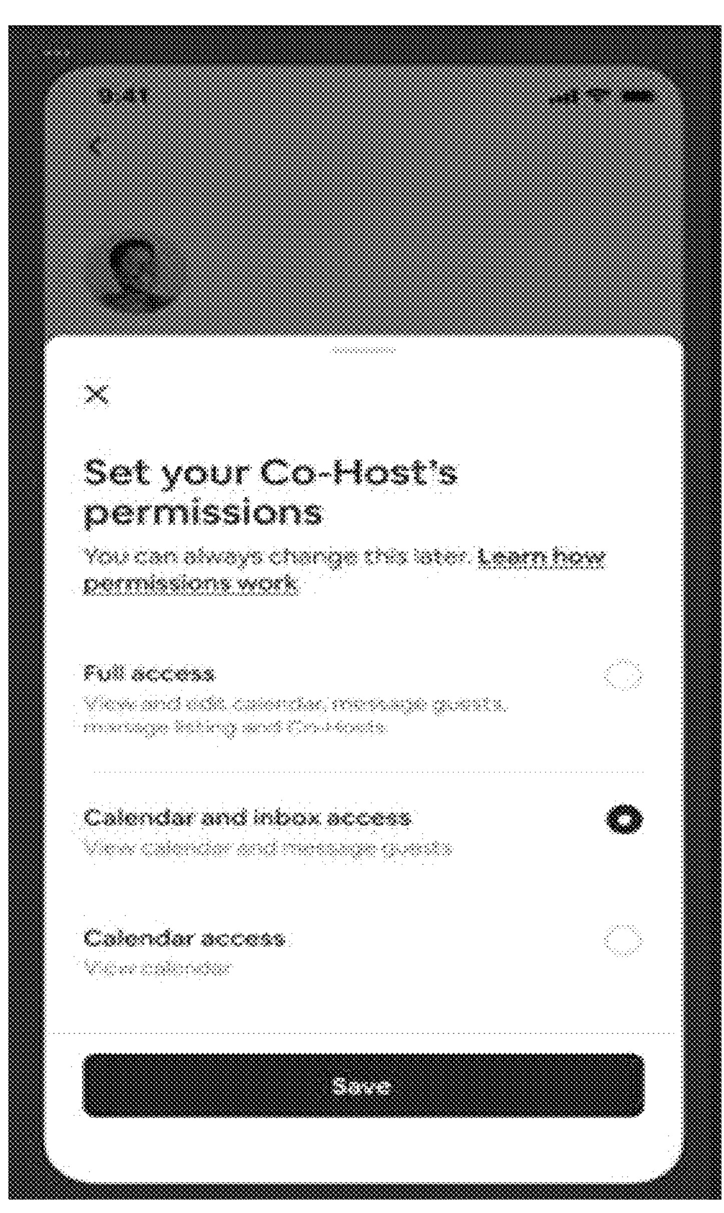
FIG. 5E shows a view of the example user interface of FIG. 5A for setting co-host permissions, according to some embodiments.

FIG. 5E shows a view 532 of the example user interface 500 for setting co-host permissions, according to some embodiments.

Figure 6A:
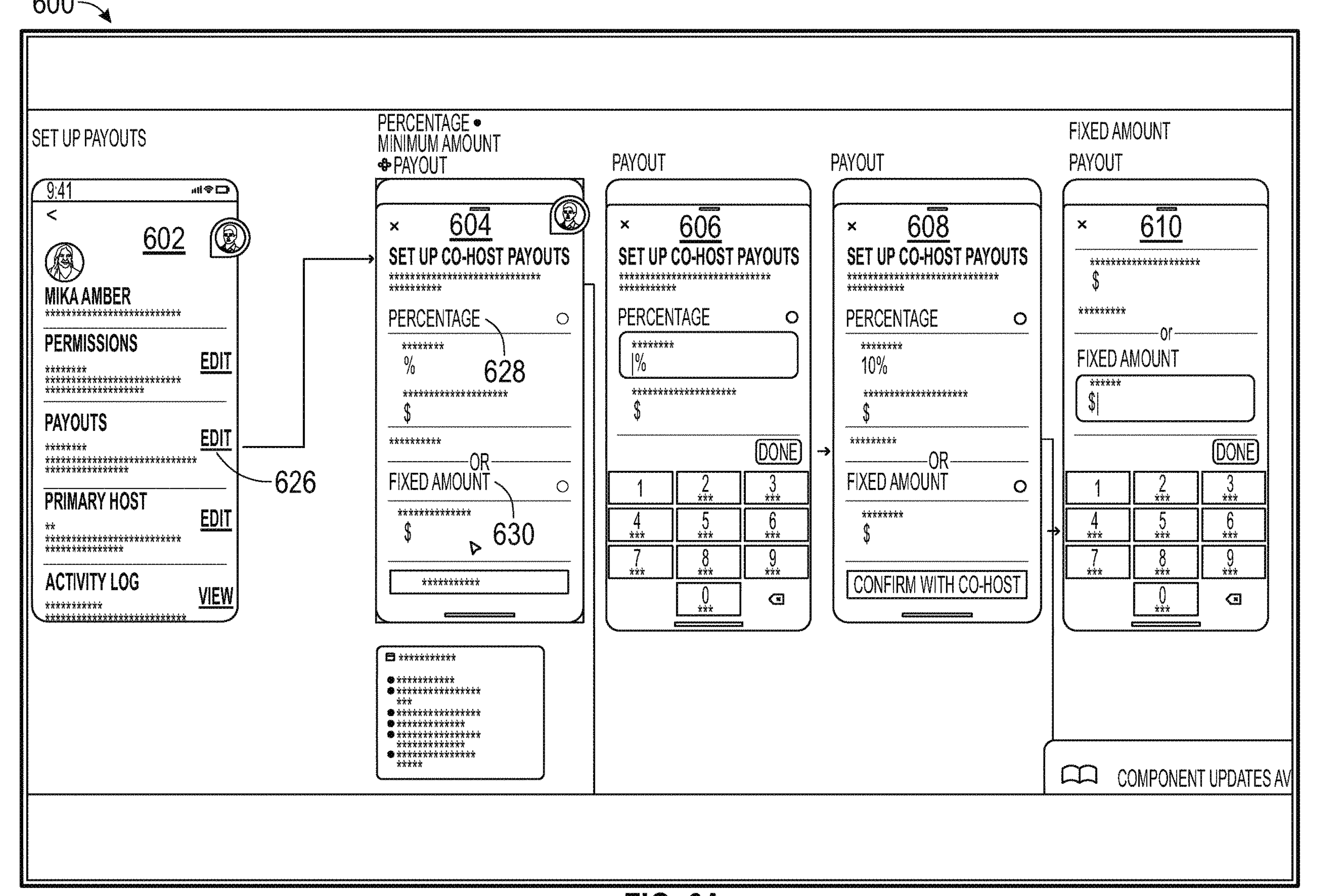
FIG. 6A shows a schematic diagram for an example process for setting payouts for co-hosts, according to some embodiments.

FIG. 6A shows a schematic diagram for an example process 600 for setting payouts for co-hosts, according to some embodiments. An owner may view details of a co-host, in a user interface 602. The owner may select a payouts options 626 in the interface. The user interface is updated to show a view 604 that allows the owner to set up co-host payouts. The view 604 shows an option 628 for setting payouts as a percentage and another option 630 for setting payouts as a fixed amount. Suppose the owner selects payout by percentage, a view 606 is shown for selecting the percentage value. The owner may save the percentage and return to the view 608 which may show the percentage payout. Alternatively, the owner may select fixed amount payout, for which the system generates and display the view 610 for selecting the fixed amount.

Figure 6B:
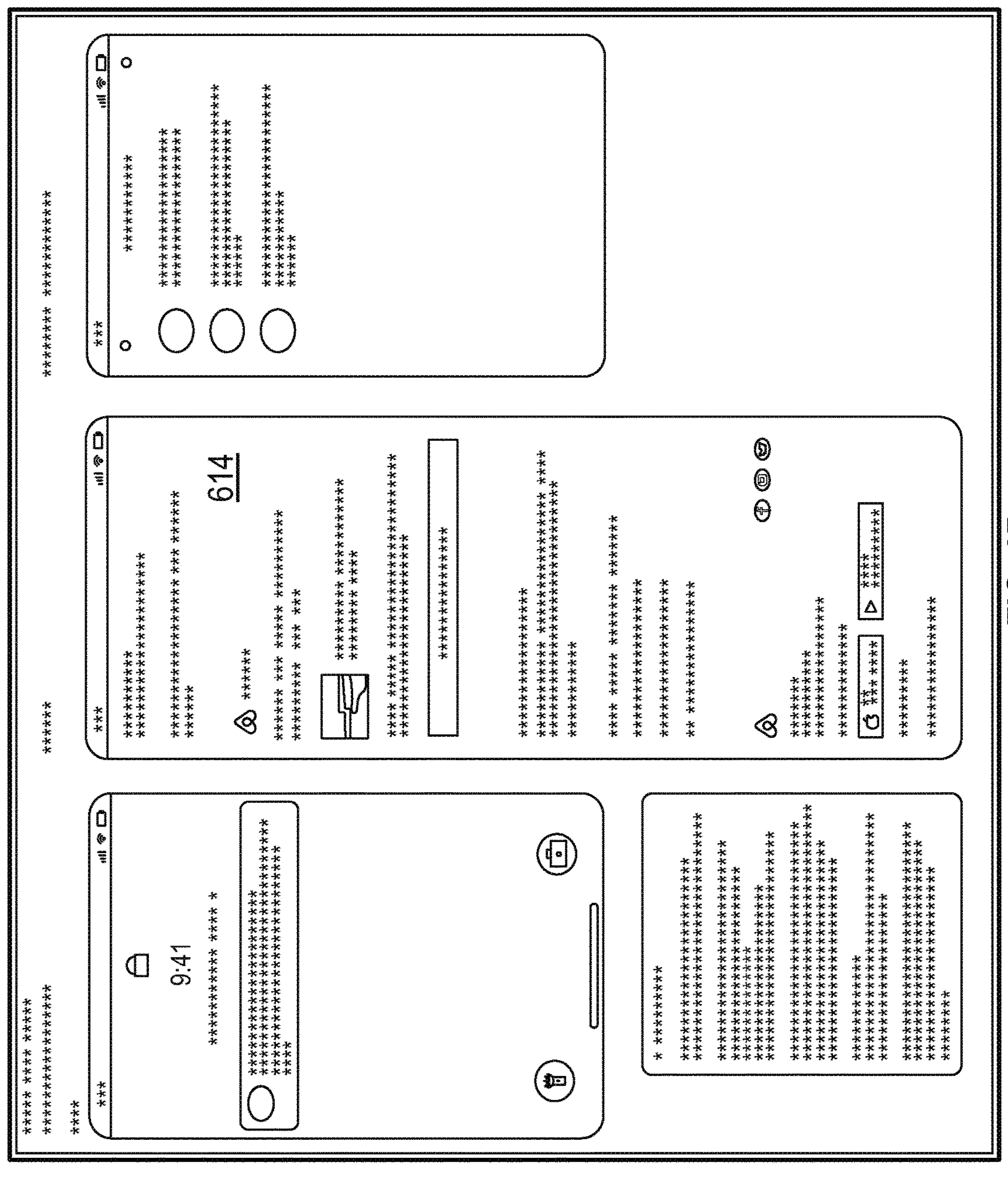
FIG. 6B shows an example notification for a co-host to set up payouts, according to some embodiments.

FIG. 6B shows an example notification 612 for a co-host to set up payouts, according to some embodiments. After an owner sets up the payout, the co-host may receive a notification (e.g., an e-mail) asking to confirm payout options.

Figure 6C:
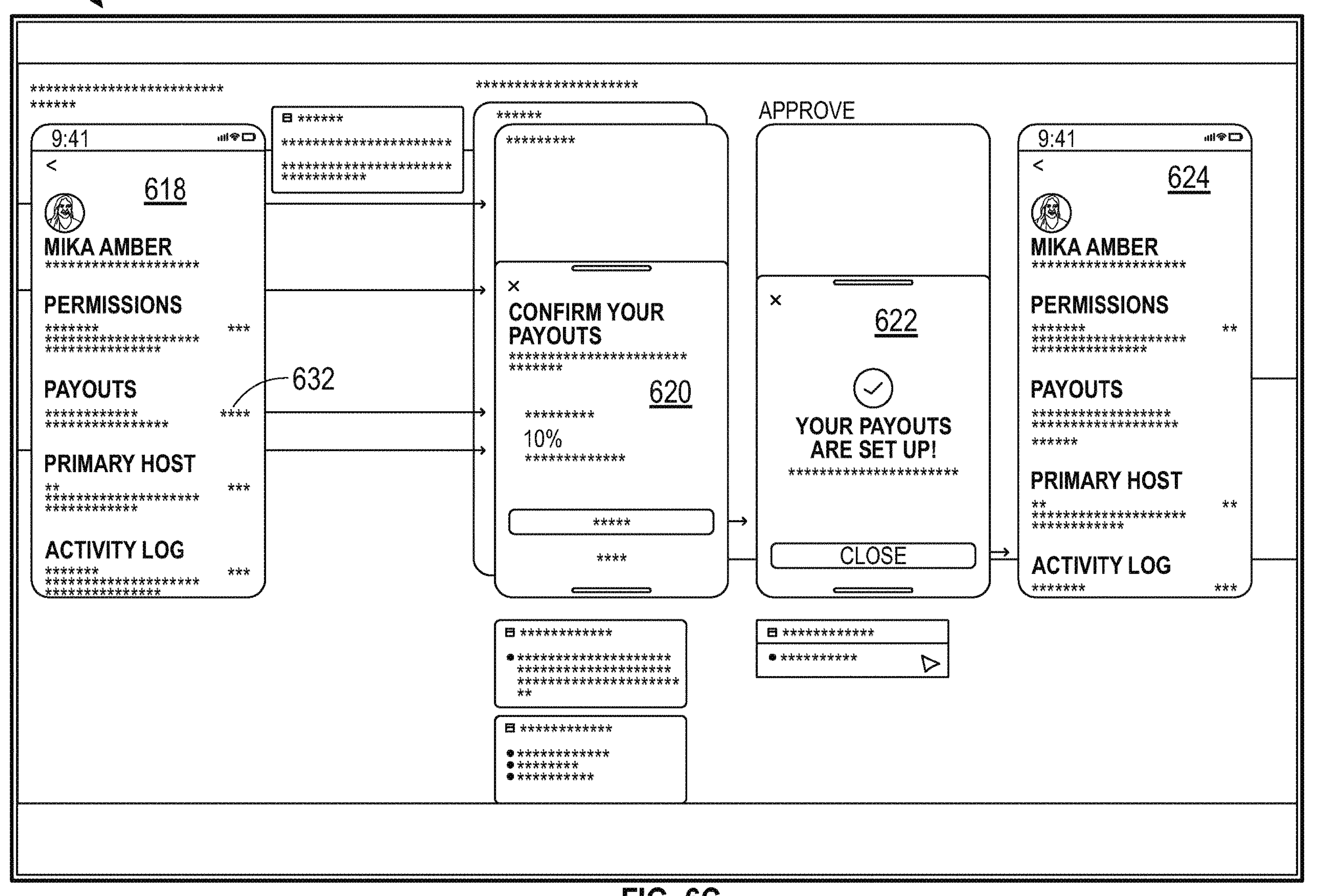
FIG. 6C shows a schematic diagram for an example process for a co-host to confirm payouts, according to some embodiments.

FIG. 6C shows a schematic diagram for an example process 616 for a co-host to confirm payouts, according to some embodiments. A co-host may be presented with an interface 618 to select payouts. After the co-host selects the payouts option 632, a payout pop-up 620 may be presented. The co-host may confirm the payout, and a confirmation notification 622 is presented in the pop-up. The option for viewing payouts is no longer present in the view 624, since the co-host has accepted the payout. Future payouts may proceed on a similar basis. The co-host may also set up automatic payouts, to accept payments via an online payment method, such that each time a reservation occurs or completes, the co-host is automatically paid.

Figure 7:
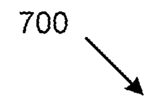
FIG. 7 illustrates an example user interface for host management in an online marketplace, according to some embodiments.
Figure 7:
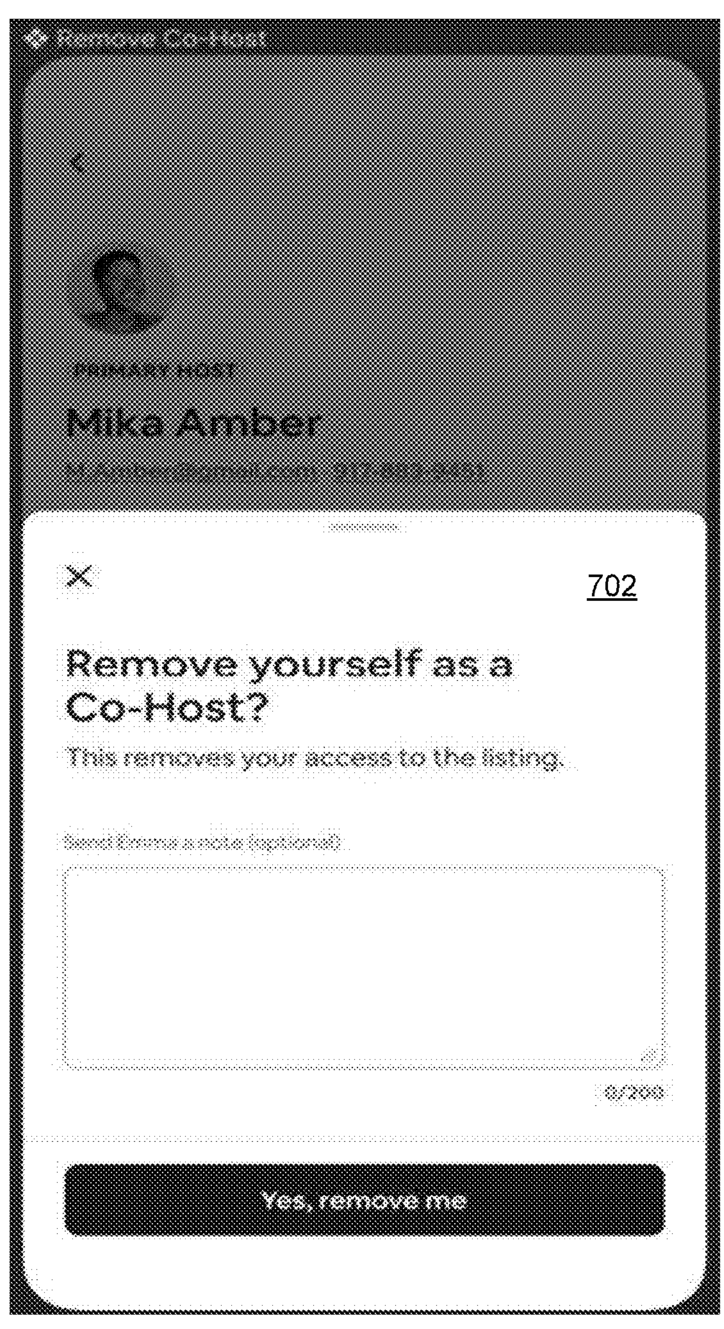

FIG. 7 illustrates an example user interface 700 (e.g., a mobile application user interface, a web browser user interface) for host management in an online marketplace, according to some embodiments. As shown, a co-host may be presented with a pop-up 702 to remove self as a co-host for a property listing.

Figure 8A:
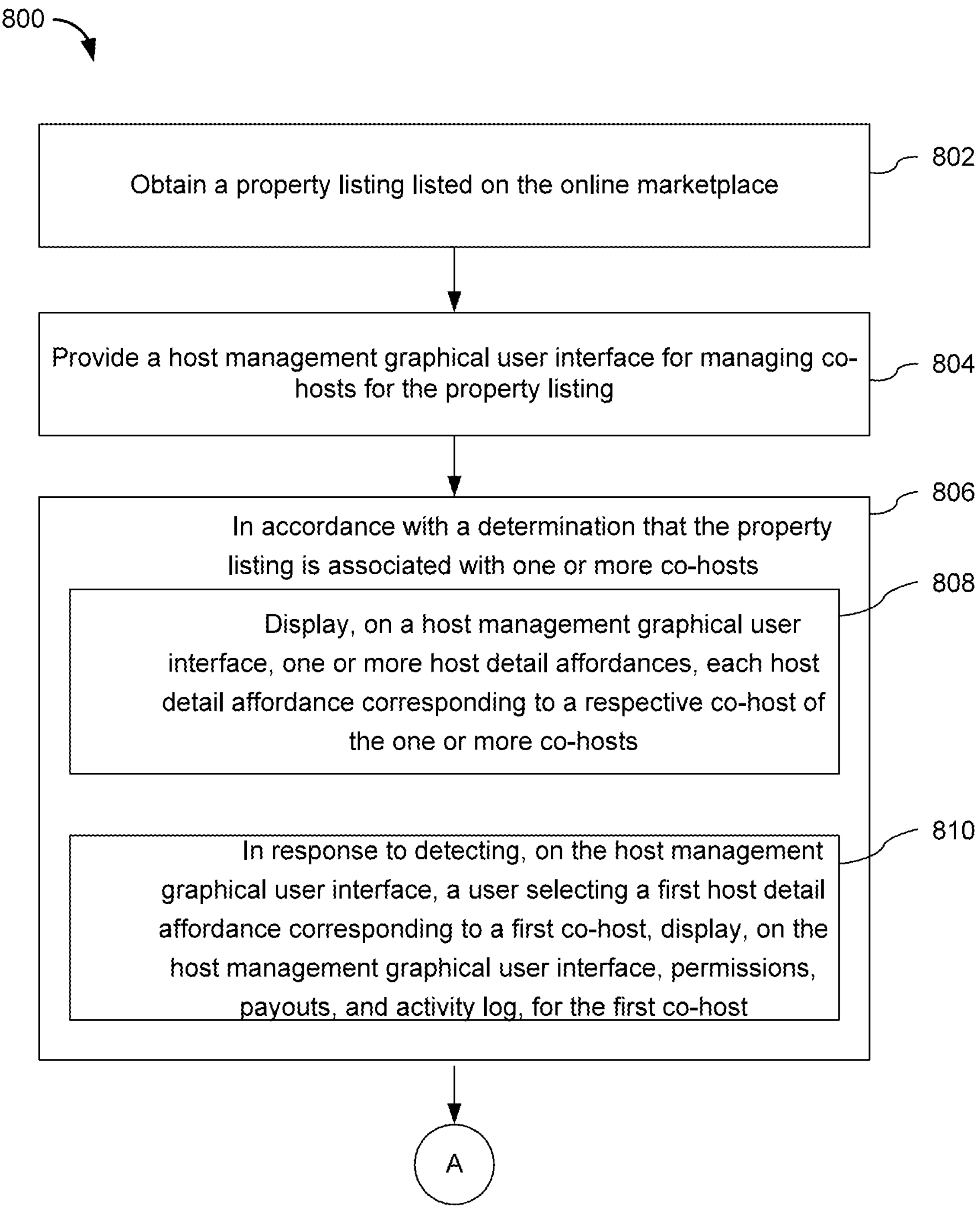
FIGS. 8A and 8B show a flow diagram of a method for co-host management in an online marketplace, according to some embodiments.
Figure 8B:
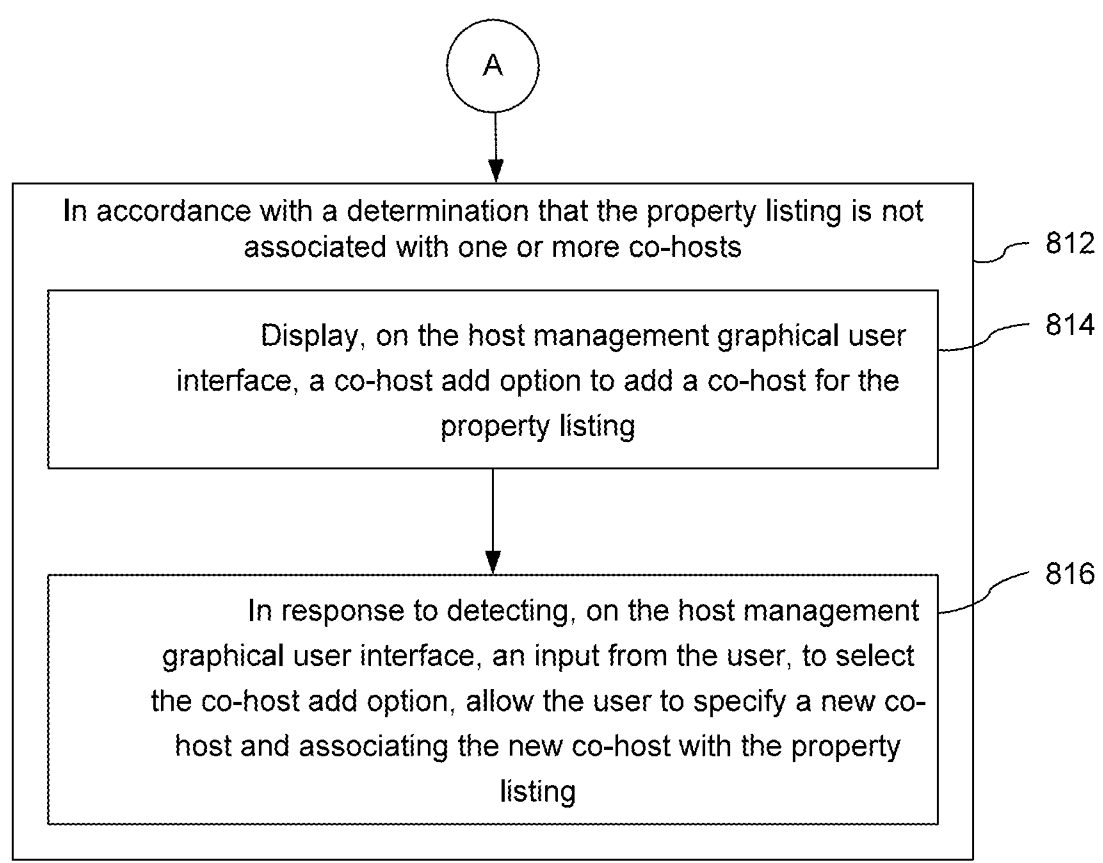

FIGS. 8A and 8B show a flow diagram of a method 800 for host management in an online marketplace, according to some embodiments. In some embodiments, the steps of the method 800 may be performed by a computer (e.g., the application server 140). In some embodiments, the steps of the method 800 may be performed by a system (e.g., the networked system 102). In some embodiments, FIGS. 8A and 8B may correspond to instructions stored in a computer memory or computer-readable storage medium (e.g., memory of the application server 140). The memory may store one or more programs configured for execution by the one or more processors. For example, the operations of the method 800 may be performed, at least in part, by the co-host management module 150 and/or the visualization module 142. In some embodiments, the steps of the method 800 may be performed by the API server 120, the web server 122, the application server 140, and/or the database server 124.

Referring to FIG. 8A, the method may include obtaining (802) a property listing listed on the online marketplace. Property lists may be stored as part of the co-host management module 150, or in the database 126. The method may also include providing (804) (e.g., by the visualization module 142) a host management graphical user interface for managing co-hosts for the property listing. The method may also include, in accordance with a determination (806) that the property listing is associated with one or more co-hosts, displaying (808), on a host management graphical user interface (e.g., an interface corresponding to the view 402 or the view 404), one or more host detail affordances (or host cards, e.g., 406-2), each host detail affordance corresponding to a respective co-host of the one or more co-hosts. The method may also include, in response to detecting, on the host management graphical user interface, a user selecting a first host detail affordance corresponding to a first co-host, displaying (810), on the host management graphical user interface, permissions, payouts, and activity log, for the first co-host. For example, in response to a user selecting 406-4, the view showing permissions 510, payouts 512, and activity log 516, may be shown.

Referring next to FIG. 8B, the method may also include, in accordance with a determination (812) that the property listing is not associated with one or more co-hosts, displaying (814), on the host management graphical user interface, a co-host add option (e.g., the option 410 or the option 420) to add a co-host for the property listing. The method may also include, in response to detecting, on the host management graphical user interface, an input from the user, to select the co-host add option, allowing (816) the user to specify a new co-host and associating the new co-host with the property listing.

In some embodiments, the method may further include displaying a plurality of tabs on the host management graphical user interface, including tabs for (i) details of the property listing, (e.g., the tab 414) (ii) settings for bookings for the property listing (e.g., the tab 416), and (iii) co-hosts to the property listing (e.g., the tab 416). The method may also include, in response to detecting, on the host management graphical user interface, the user selecting the tab for co-hosts, either displaying, on the host management graphical user interface, the one or more host detail affordances and/or the co-host add option to add a co-host for the property listing.

In some embodiments, the method may further include displaying, on the host management graphical user interface, a permission edit option (e.g., option for permissions 510) to set or edit permissions for the first co-host. The method may also include, in response to detecting, on the host management graphical user interface, the user selecting the permission edit option, displaying, on the host management graphical user interface, a permission pop-up overlay (e.g., the pop-up 520) that shows a plurality of permission options for setting or editing permissions for the first co-host. The method may also include, in response to detecting, on the host management graphical user interface, the user selecting a permission option of the plurality of permission options, (i) updating the permissions the first co-host, and (ii) updating the host management graphical user interface to indicate a change in the permissions for the first co-host. Examples of permissions set-up and various options levels are described above in reference to FIGS. 5A-5E, according to some embodiments. In some embodiments, the plurality of permission options may include full access, calendar and inbox access, and calendar access. The calendar access may provide access to view calendar information for the property listing. The calendar and inbox access may provide access to view calendar information and mail information for the property listing, and one or more messaging options to message one or more guests of the property listing. The full access may provide access to pricing information, view and edit calendar and inbox for the property listing, the one or more messaging options, and one or more management options to manage views of the property listing. In some embodiments, in response to detecting, on the host management graphical user interface, the user selecting the permission option of the plurality of permission options, the method may further include allowing the user to associate a time limit for the permission option and updating the host management graphical user interface to indicate the time limit in the permissions for the first co-host.

In some embodiments, the method may further include, in accordance with a determination that the user is an owner of the property listing, (i) allowing the user to update payouts for the first co-host, via the host management graphical user interface; (ii) associating the first co-host with the updated payouts; and (iii) updating the host management graphical user interface to display the updated payouts for the first co-host. In some embodiments, allowing the user to change payouts comprises displaying a plurality of payout options for payouts including (i) a percentage value for total booking revenue and (ii) a fixed amount. In some embodiments, the owner may send payout to multiple co-hosts for payout splits. In some embodiments, the method may further include displaying, on the host management graphical user interface, a confirm option to confirm the updated payouts with the first co-host. The method may also include, in response to detecting, on the host management graphical user interface, the user selecting the confirm option, sending a request to the first co-host to confirm the updated payouts. The method may also include, in response to receiving a response from the first co-host to confirm the updated payouts, associating the first co-host with the updated payouts. The method may also include updating the host management graphical user interface to display the updated payouts for the co-host. Examples for payout setting or updating payouts, confirmations and notifications are described above in reference to FIGS. 6A-6C, according to some embodiments.

In some embodiments, the method may further include, in response to detecting, on the host management graphical user interface, the user selecting the first host detail affordance corresponding to the first co-host, displaying, on the host management graphical user interface, a primary host option to update status of the first co-host as a primary host. Some embodiments may allow only full access co-hosts to be a primary host. The method may also include, in response to detecting, on the host management graphical user interface, the user selecting the primary host option, allowing the user to update the status of the first co-host as a primary host, and updating the host management graphical user interface to indicate the update. An example is described above in reference to FIG. 5D, according to some embodiments.

In some embodiments, the method may further include, displaying, on the host management graphical user interface, pending invitations (e.g., invitation 412) to other users to be added as a co-host.

In some embodiments, the method may further include, in accordance with a determination that the user is a co-host for the property listing, allowing the user, via the host management graphical user interface, to remove self from co-hosting the property listing, updating co-hosts for the property listing, and updating the host management graphical user interface to cease displaying the property listing for the user. An example is described above in reference to FIG. 7, according to some embodiments.

In some embodiments, the method may further include, displaying, on the host management graphical user interface, the co-host add option, in accordance with a determination that the user is an owner or a full access co-host of the property listing. In other words, in some embodiments, only an owner or a full access co-host can add co-hosts. For example, the example user interfaces described above in reference to FIG. 4B may be shown to an owner or a full access co-host, but not shown to other co-hosts.

In some embodiments, the method may further include, in accordance with a determination that the user is an owner of the property listing, providing a stop payout option on the host management graphical user interface, to stop payouts to the one or more co-hosts. In other words, in some embodiments, only an owner may stop payouts for a property listing. In some embodiments, only owners may send payout agreement to co-hosts. In some embodiments, if a payout agreement has been set up, both owner and payee may stop payouts and/or payout agreement. Although not explicitly shown in the Figures, the payouts option described above in reference to FIG. 6A, may be toggled to a stop payout option, after the payouts are set up.

In some embodiments, the method may further include, in accordance with a determination that the user is a full-access co-host (e.g., a co-host for adjusting the property listing and booking setting, accepting and declining reservations, coordinating with guests, and handling turnover at end of a reservation) responsible for end-to-end listing management, providing, to the user, access to pricing information, view and edit calendar and inbox for the property listing, one or more messaging options to message one or more guests of the property listing, one or more management options to manage views of the property listing, and corresponding notifications, except for personal profile information and financial details of one or more owners of the property listing. For example, in reference to FIG. 5E, after the co-host's permissions are set to full access, the co-host may be provided access to access to pricing information, view and edit calendar and inbox for the property listing, one or more messaging options to message one or more guests of the property listing, one or more management options to manage views of the property listing, and corresponding notifications.

In some embodiments, the method may further include, in accordance with a determination that the user is an inbox and calendar only co-host responsible for handling on-trip guest support, providing, to the user, access to calendar and inbox, access to view calendar information and mail information for the property listing, one or more messaging options to message one or more guests of the property listing, and corresponding notifications, for the property listing. For example, in reference to FIG. 5E, after the co-host's permissions are set to inbox and calendar only co-host, the co-host may be provided access to calendar and inbox, access to view calendar information and mail information for the property listing, one or more messaging options to message one or more guests of the property listing, and corresponding notifications, for the property listing.

In some embodiments, the method may further include, in accordance with a determination that the user is calendar only co-host responsible for handling support tasks (e.g., cleaning, photographing and turnover), providing, to the user, access to view calendar information and corresponding notifications, for the property listing. For example, in reference to FIG. 5E, after the co-host's permissions are set to calendar access, the co-host may be provided access to view calendar information and corresponding notifications, for the property listing.

In some embodiments, the method may further include (i) associating a respective permission level of a plurality of permission levels for one or more co-hosts of the property listing, and (ii) updating activity log for each co-host based on their respective permission level. Examples of activity log are described above in reference to FIGS. 5A-5D, according to some embodiments.

In some embodiments, the host management user interface may include one or more user interface surfaces. The method may further include (i) associating a respective permission level of a plurality of permission levels for one or more co-hosts of the property listing, and (ii) showing or hiding at least one surface of the one or more surfaces based on permission levels for one or more co-hosts of the property listing. For example, the tabs in FIG. 4A may correspond to different surfaces, the payout pop-ups in FIG. 6A may correspond to different surfaces, and so on. Different affordances may correspond to different user interface surfaces. These surfaces may be individually, independently, and/or concurrently controlled based on permission levels. The host management graphical user interface may support multi-user, multi-tenant, and/or concurrent modification of these user interface surfaces. Each co-host may be on a different (or a same) network. Each co-host may operate the host management graphical user interface using different client devices.

In some embodiments, the method may further include (i) associating a respective permission level of a plurality of permission levels for one or more co-hosts of the property listing; and (ii) using a notification customization library to control notifications for the one or more co-hosts based on particular permission levels. Some embodiments use co-host roles to better support collaborative hosting. Notifications may include emails, push, SMS notifications to hosts from different flows, such as reservation inquiry, reservation alteration, and review. Not all co-hosts may receive all notifications. The notifications may be managed using role-based rules. For example, a cleaner may not receive reservation inquiry notifications but may receive reservation alteration notifications. A notification customization library may be used to resolve users based on user roles. Clients/services generating notifications for different templates may invoke the notification library to request a list of users for a list of user roles. Some embodiments may centralize user resolution, and/or hide complexity of different client services calling for role/user fetching. The library may support new roles, such as co-travelers, and/or may use a predefined set of roles (e.g., owner, primary host, co-hosts). Example notifications are described above in reference to FIG. 4D, according to some embodiments.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described embodiments. The first widget and the second widget are both widgets, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the particular uses contemplated.

What is claimed is:

1. A method for host management in an online marketplace, the method comprising:

at a computing system having one or more processors and memory storing one or more programs configured for execution by the one or more processors:

obtaining a property listing listed on the online marketplace;

providing a host management graphical user interface for managing co-hosts for the property listing, wherein the host management graphical user interface is concurrently accessible by one or more co-hosts; and in accordance with a determination that the property listing is associated with the one or more co-hosts:

displaying, on the host management graphical user interface, one or more host detail affordances, each host detail affordance corresponding to a respective co-host of the one or more co-hosts; and in response to detecting, on the host management graphical user interface, a user selecting a first host detail affordance corresponding to a first co-host, displaying, on the host management graphical user interface, permissions, payouts, and activity log, for the first co-host; and in accordance with a determination that the property listing is not associated with the one or more co-hosts:

displaying, on the host management graphical user interface, a co-host add option to add a co-host for the property listing;

in response to detecting, on the host management graphical user interface, an input from the user, to select the co-host add option, allowing the user to specify a new co-host and associating the new co-host with the property listing;

associating a respective permission level of a plurality of permission levels to the respective co-host of the one or more co-hosts, wherein the plurality of permission levels include a first permission level granting full access to information for the property listing, a second permission level granting calendar and inbox access for the property listing, and a third permission level granting calendar access for the property listing for the respective co-host;

determining a respective user interface;

displaying, on the host management graphical user interface, a permission edit option to set or edit permissions for the first co-host; and in response to detecting, on the host management graphical user interface, the user selecting the permission edit option:

displaying, on the host management graphical user interface, a permission pop-up overlay that shows a plurality of permission options for setting or editing permissions for the first co-host, and in response to detecting, on the host management graphical user interface, the user selecting a permission option of the plurality of permission options, (i) updating the permissions for the first co-host, and (ii) updating the host management graphical user interface to indicate a change in the permissions for the first co-host, wherein in response to detecting, on the host management graphical user interface, the user selecting the permission option of the plurality of permission options, further allowing the user to associate a time limit for the permission option and updating the host management graphical user interface to indicate the time limit in the permissions for the first co-host.

2. The method of claim 1, further comprising:

displaying a plurality of tabs on the host management graphical user interface, including tabs for (i) details of the property listing, (ii) settings for bookings for the property listing, and (iii) co-hosts for the property listing; and in response to detecting, on the host management graphical user interface, the user selecting the tab for co-hosts, displaying, on the host management graphical user interface, the one or more host detail affordances and/or the co-host add option to add a co-host for the property listing.

3. The method of claim 1, wherein:

the plurality of permission options include the full access, the calendar and inbox access, and the calendar access;

the calendar access provides access to view calendar information for the property listing;

the calendar and inbox access provides access to view calendar information and mail information for the property listing, and one or more messaging options to message one or more guests of the property listing; and the full access provides access to pricing information, view and edit calendar and inbox for the property listing, the one or more messaging options, and one or more management options to manage views of the property listing.

4. The method of claim 1, further comprising:

in accordance with a determination that the user is an owner of the property listing:

allowing the user to update payouts for the first co-host, via the host management graphical user interface; and associating the first co-host with the updated payouts; and updating the host management graphical user interface to display the updated payouts for the first co-host.

5. The method of claim 4, wherein allowing the user to change payouts comprises displaying a plurality of payout options for payouts including (i) a percentage value for total booking revenue and (ii) a fixed amount.

6. The method of claim 4, further comprising:

displaying, on the host management graphical user interface, a confirm option to confirm the updated payouts with the first co-host;

in response to detecting, on the host management graphical user interface, the user selecting the confirm option, sending a request to the first co-host to confirm the updated payouts; and in response to receiving a response from the first co-host to confirm the updated payouts:

associating the first co-host with the updated payouts; and updating the host management graphical user interface to display the updated payouts for the first co-host.

7. The method of claim 1, further comprising:

in response to detecting, on the host management graphical user interface, the user selecting the first host detail affordance corresponding to the first co-host, displaying, on the host management graphical user interface, a primary host option to update the status of the first co-host as a primary host; and in response to detecting, on the host management graphical user interface, the user selecting the primary host option, allowing the user to update the status of the first co-host as a primary host, and updating the host management graphical user interface to indicate the update.

8. The method of claim 1, further comprising:

displaying, on the host management graphical user interface, pending invitations to other users to be added as a co-host.

9. The method of claim 1, further comprising:

in accordance with a determination that the user is a co-host for the property listing, allowing the user, via the host management graphical user interface, to remove self from co-hosting the property listing, updating co-hosts for the property listing, and updating the host management graphical user interface to cease displaying the property listing for the user.

10. The method of claim 1, further comprising:

displaying, on the host management graphical user interface, the co-host add option, in accordance with a determination that the user is an owner or a full access co-host of the property listing.

11. The method of claim 1, further comprising:

in accordance with a determination that the user is an owner of the property listing, providing a stop payout option on the host management graphical user interface, to stop payouts to the one or more co-hosts.

12. The method of claim 1, further comprising:

in accordance with a determination that the user is a full-access co-host responsible for end-to-end listing management:

providing, to the user, access to pricing information, view and edit calendar and inbox for the property listing, one or more messaging options to message one or more guests of the property listing, one or more management options to manage views of the property listing, and corresponding notifications, except for personal profile information and financial details of one or more owners of the property listing.

13. The method of claim 1, further comprising:

in accordance with a determination that the user is an inbox and calendar only co-host responsible for handling on-trip guest support:

providing, to the user, access to view calendar information and mail information for the property listing, one or more messaging options to message one or more guests of the property listing, and corresponding notifications, for the property listing.

14. The method of claim 1, further comprising:

in accordance with a determination that the user is calendar only co-host responsible for handling support tasks:

providing, to the user, access to view calendar information and corresponding notifications, for the property listing.

15. The method of claim 1, further comprising:

associating a respective permission level of a plurality of permission levels for one or more co-hosts of the property listing; and updating activity logs for each co-host based on their respective permission level.

16. The method of claim 1, the method further comprising:

using a notification customization library to control notifications for the one or more co-hosts based on particular permission levels.

17. A system comprising a server including one or more processors and memory storing one or more programs to be executed by the one or more processors, the one or more programs including instructions for: obtaining a property listing listed on an online marketplace;

providing a host management graphical user interface for managing co-hosts for the property listing, wherein the host management graphical user interface is concurrently accessible by one or more co-hosts; and in accordance with a determination that the property listing is associated with the one or more co-hosts:

displaying, on the host management graphical user interface, one or more host detail affordances, each host detail affordance corresponding to a respective co-host of the one or more co-hosts; and in response to detecting, on the host management graphical user interface, a user selecting a first host detail affordance corresponding to a first co-host, displaying, on the host management graphical user interface, permissions, payouts, and activity logs, for the first co-host; and in accordance with a determination that the property listing is not associated with the one or more co-hosts:

displaying, on the host management graphical user interface, a co-host add option to add a co-host for the property listing;

in response to detecting, on the host management graphical user interface, an input from the user, to select the co-host add option, allowing the user to specify a new co-host and associating the new co-host with the property listing, associating a respective permission level of a plurality of permission levels to the respective co-host of the one or more co-hosts wherein the plurality of permission levels include a first permission level granting full access to information for the property listing, a second permission level granting calendar and inbox access for the property listing, and a third permission level granting calendar access for the property listing;

for the respective co-host, determining a respective user interface;

displaying, on the host management graphical user interface, a permission edit option to set or edit permissions for the first co-host; and in response to detecting, on the host management graphical user interface, the user selecting the permission edit option:

displaying, on the host management graphical user interface, a permission pop-up overlay that shows a plurality of permission options for setting or editing permissions for the first co-host, and in response to detecting, on the host management graphical user interface, the user selecting a permission option of the plurality of permission options, (i) updating the permissions for the first co-host, and (ii) updating the host management graphical user interface to indicate a change in the permissions for the first co-host, wherein in response to detecting, on the host management graphical user interface, the user selecting the permission option of the plurality of permission options, further allowing the user to associate a time limit for the permission option and updating the host management graphical user interface to indicate the time limit in the permissions for the first co-host.

18. A non-transitory computer readable storage medium storing one or more programs configured for execution by a computer system having a display, one or more processors, and memory, the one or more programs comprising instructions for:

obtaining a property listing listed on an online marketplace;

providing a host management graphical user interface for managing co-hosts for the property listing, wherein the host management graphical user interface is concurrently accessible by one or more co-hosts; and in accordance with a determination that the property listing is associated with the one or more co-hosts:

displaying, on the host management graphical user interface, one or more host detail affordances, each host detail affordance corresponding to a respective co-host of the one or more co-hosts; and in response to detecting, on the host management graphical user interface, a user selecting a first host detail affordance corresponding to a first co-host, displaying, on the host management graphical user interface, permissions, payouts, and activity logs, for the first co-host; and in accordance with a determination that the property listing is not associated with the one or more co-hosts:

displaying, on the host management graphical user interface, a co-host add option to add a co-host for the property listing;

in response to detecting, on the host management graphical user interface, an input from the user, to select the co-host add option, allowing the user to specify a new co-host and associating the new co-host with the property listing, associating a respective permission level of a plurality of permission levels to the respective co-host of the one or more co-hosts, wherein the plurality of permission levels include a first permission level granting full access to information for the property listing, a second permission level granting calendar and inbox access for the property listing, and a third permission level granting calendar access for the property listing;

for the respective co-host, determining a respective user interface;

displaying, on the host management graphical user interface, a permission edit option to set or edit permissions for the first co-host; and in response to detecting, on the host management graphical user interface, the user selecting the permission edit option:

displaying, on the host management graphical user interface, a permission pop-up overlay that shows a plurality of permission options for setting or editing permissions for the first co-host, and in response to detecting, on the host management graphical user interface, the user selecting a permission option of the plurality of permission options, (i) updating the permissions for the first co-host, and (ii) updating the host management graphical user interface to indicate a change in the permissions for the first co-host, wherein in response to detecting, on the host management graphical user interface, the user selecting the permission option of the plurality of permission options, further allowing the user to associate a time limit for the permission option and updating the host management graphical user interface to indicate the time limit in the permissions for the first co-host.

* * * * *